(12) United States Patent
Jiang et al.

(10) Patent No.: US 11,528,704 B2
(45) Date of Patent: Dec. 13, 2022

(54) METHOD AND DEVICE USED IN UE AND BASE STATION FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 54 days.

(21) Appl. No.: 17/005,338

(22) Filed: Aug. 28, 2020

(65) Prior Publication Data

US 2021/0029710 A1    Jan. 28, 2021

Related U.S. Application Data

(63) Continuation of application No. PCT/CN2019/076879, filed on Mar. 4, 2019.

(30) Foreign Application Priority Data

Mar. 7, 2018   (CN) .......................... 201810186803.9

(51) Int. Cl.
*H04W 72/04* (2009.01)
*H04L 1/00* (2006.01)
(Continued)

(52) U.S. Cl.
CPC ....... *H04W 72/0453* (2013.01); *H04L 1/0003* (2013.01); *H04L 1/1819* (2013.01);
(Continued)

(58) Field of Classification Search
CPC ................................................. H04W 72/0453
See application file for complete search history.

(56) References Cited

U.S. PATENT DOCUMENTS

2017/0231005 A1* 8/2017 Babaei ................. H04L 5/001
2018/0049175 A1   2/2018 Bagheri et al.
(Continued)

FOREIGN PATENT DOCUMENTS

CN        101370250 A       2/2009
CN        101771503 A       7/2010
(Continued)

OTHER PUBLICATIONS

ISR in application No. PCT/CN2019/076879 dated in May 14, 2019.
(Continued)

*Primary Examiner* — Jason E Mattis

(57) ABSTRACT

The disclosure provides method and device in used in User Equipment (UE) and base station for wireless communication. The UE receives a first signaling in a first time window, then receives a second signaling group in a second time window, the second signaling group being used for indicating K2 candidate frequency band resource(s), and monitors a third signaling in a second frequency band resource; the second signaling group includes Q1 physical layer signaling(s); the second frequency band resource is one of the K2 candidate frequency band resource(s), and a first field in the first signaling is used for determining the second frequency band resource from the K2 candidate frequency band resource(s). Through determining the second frequency band resource from the K2 candidate frequency band resource(s) dynamically, the disclosure improves frequency band utilization on unlicensed spectrum under the premise
(Continued)

of guaranteeing scheduling flexibility, thereby improving overall performances of the system.

16 Claims, 16 Drawing Sheets

(51) Int. Cl.
*H04L 1/18* (2006.01)
*H04L 5/00* (2006.01)
*H04W 24/08* (2009.01)
*H04W 92/10* (2009.01)

(52) U.S. Cl.
CPC .......... *H04L 5/0051* (2013.01); *H04W 24/08* (2013.01); *H04W 72/0446* (2013.01); *H04W 72/0493* (2013.01); *H04W 92/10* (2013.01)

(56) References Cited

U.S. PATENT DOCUMENTS

| | | | |
|---|---|---|---|
| 2020/0120720 A1* | 4/2020 | Wu | H04W 72/04 |
| 2020/0170016 A1* | 5/2020 | Ji | H04W 72/0453 |
| 2020/0314845 A1* | 10/2020 | Miao | H04W 72/042 |
| 2020/0404699 A1* | 12/2020 | Zheng | H04L 5/0053 |

FOREIGN PATENT DOCUMENTS

| | | |
|---|---|---|
| CN | 105208656 A | 12/2015 |
| CN | 106559202 A | 4/2017 |
| CN | 106561066 | 4/2017 |
| WO | 2015061952 A1 | 5/2015 |
| WO | 2018028625 A | 2/2018 |

OTHER PUBLICATIONS

RI-094663:Improved Access-backhaul Partition Scheme for TDD Relay Nokia,Nov. 13, 2009.
CN201810186803.9 Notification to Grant Patent Right for Invention dated Feb. 4, 2021.
CN201810186803.9 1st Office Action dated Dec. 28, 2020.
CN201810186803.9 First Search Report dated Dec. 17, 2020.

* cited by examiner

METHOD AND DEVICE USED IN UE AND BASE STATION FOR WIRELESS COMMUNICATION

CROSS REFERENCE TO RELATED APPLICATIONS

This application is a continuation of International Application No. PCT/CN2019/076879, filed Mar. 4, 2019, claims the priority benefit of Chinese Patent Application No. 201810186803.9, filed on Mar. 7, 2018, the full disclosure of which is incorporated herein by reference.

BACKGROUND

Technical Field

The disclosure relates to transmission methods and devices in wireless communication systems, and in particular to a transmission method and device on unlicensed spectrum.

RELATED ART

At present, in 5G New Radio Access Technology (NR) Phase 1 systems, in order to support multiple subcarrier spacings in one system bandwidth, considering reasons such as terminal receiving bandwidth limited, 5G systems introduce a concept of BWP, that is, when one cell has one Component Carrier (CC) with big bandwidth, a base station can divide the big CC into multiple BWPs so as to adapt to the User Equipment (UE) with small receiving and transmitting bandwidth capabilities; when the UE with small bandwidth capability performs communication with a cell, the UE performs downlink reception or uplink transmission on one BWP only. Meanwhile, in order to improve the flexibility and timeliness of configuration of BWP, the base station can dynamically switch a BWP employing Downlink Control Information (DCI) containing scheduling.

In future 5G NR Phase 2 and following evolved releases, standalone Licensed Assisted Access (LAA) scenarios will be discussed and employed; however, in standalone LAA, dynamic switch of BWP need to be designed again.

SUMMARY

In standalone LAA, one typical application scenario is that a base station performs separate energy detections on multiple BWPs in one system bandwidth and schedules a terminal onto an unoccupied BWP among the multiple BWPs to perform data transmission. At present, signalings for dynamic switch of BWP are all transmitted through User Equipment (UE)-specific DCIs. However, the above method will have a problem in standalone LAA, that is, when a base station triggers BWP switching through a DCI, the base station cannot know in advance that the BWP for switchover is not occupied; when the base station finds the BWP for switchover is occupied, the base station cannot transmit scheduling, thus the above BWP switching is meaningless. One simple approach for the above problem is that the base station will keep a BWP for switchover occupied all the time after transmitting a BWP switching signaling, for example, transmitting some redundant information on the BWP for switchover. However, this method obviously reduces scheduling flexibility and spectrum efficiency, and will subject to regulations of Max Channel Occupy Time (MCOT) in various countries.

In view of the above problems, the disclosure provides a solution. It should be noted that the embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred.

The disclosure provides a method in a UE for wireless communication, wherein the method includes:
  receiving a first signaling in a first time window;
  receiving a second signaling group in a second time window, the second signaling group being used for indicating K2 candidate frequency band resource(s); and
  monitoring a third signaling in a second frequency band resource.

Herein, the second signaling group includes Q1 physical layer signaling(s), and the Q1 is a positive integer; the second frequency band resource is one of the K2 candidate frequency band resource(s), and a first field in the first signaling is used for determining the second frequency band resource from the K2 candidate frequency band resource(s); the first signaling is a physical layer signaling, and the third signaling is a physical layer signaling; and the K2 is a positive integer.

In one embodiment, the above method has the following benefits: a frequency band resource corresponds to a BWP, the first signaling is used for dynamically switching the BWP, and the second signaling group is used for indicating which BWPs are not occupied; the first signaling and the second signaling group are simultaneously used for determining the second frequency band resource; the first signaling is generated by the base station based on the consideration of scheduling flexibility and load balance, and the second signaling group is generated based on Listen Before Talk (LBT) results on multiple candidate frequency band resources. The above method achieves scheduling flexibility and load balance while guaranteeing that the frequency band resource to switch to is not occupied.

In one embodiment, the above method has another following benefit: the second signaling group may be transmitted on one BWP, thereby reducing the complexity of blind detection and the latency of processing of the UE.

According to one aspect of the disclosure, the above method includes:
  operating a first radio signal.
  Herein, the operating is receiving, or the operating is transmitting; the third signaling includes first configuration information, and the first configuration information is applicable to the first radio signal; and the first configuration information includes at least one of occupied frequency domain resources, occupied time domain resources, a Modulation and Coding Scheme (MCS) and a Hybrid Automatic Repeat request (HARQ) process number.

In one embodiment, the above method is characterized in that: the third signaling is a scheduling for the first radio signal.

According to one aspect of the disclosure, the above method includes:
  receiving K1 first-type information group(s).
  Herein, the K1 first-type information group(s) is(are) specific for K1 first-type frequency band resource(s) respectively; the K2 candidate frequency band resource(s) is(are) a subset belonging to the K1 first-type frequency band resource(s); the K1 first-type information group(s) is(are) all transmitted through an air interface; and the K1 is positive integer.

In one embodiment, the above method has the following benefits: the K1 first-type information group(s) is(are) configured for the K1 first-type frequency band resource(s) respectively; the K1 first-type information group(s) is(are) cell specific and will not change with the dynamic switch of BWP, which is convenient for the UE to receive and interpret, without ambiguity.

According to one aspect of the disclosure, the above method includes:

receiving K3 second-type information group(s).

Herein, the K3 second-type information group(s) is(are) specific for the K2 candidate frequency band resource(s), and the K3 second-type information group(s) is(are) all transmitted through an air interface; and the K3 is a positive integer.

In one embodiment, the above method has the following benefits: the K3 second-type information group(s) is(are) configured for the K2 candidate frequency band resource(s); the K2 candidate frequency band resource(s) change(s) dynamically, and the actual candidate frequency band resource to which the K3 second-type information group(s) applies(apply) changes with the K2 candidate frequency band resource(s); the above method simplifies the design of BWP related configuration information for the UE, and can more flexibly update UE-specific higher layer configuration information.

According to one aspect of the disclosure, the above method includes:

detecting K2 first-type reference signal(s) in the K1 first-type frequency band resource(s) in the second time window.

Herein, a detection for the K2 first-type reference signal(s) is used for determining the K2 candidate frequency band resource(s).

In one embodiment, the above method has the following benefits: the first-type reference signal similar to DRS helps the UE determine one step ahead the K2 candidate frequency band resource(s) already occupied by the base station, thereby reducing the complexity of reception of the UE and reducing the probability of error detection of DCI.

The disclosure provides a method in a base station for wireless communication, wherein the method includes:

transmitting a first signaling in a first time window;

transmitting a second signaling group in a second time window, the second signaling group being used for indicating K2 candidate frequency band resource(s); and transmitting a third signaling in a second frequency band resource.

Herein, the second signaling group includes Q1 physical layer signaling(s), and the Q1 is a positive integer; the second frequency band resource is one of the K2 candidate frequency band resource(s), and a first field in the first signaling is used for determining the second frequency band resource from the K2 candidate frequency band resource(s); the first signaling is a physical layer signaling, and the third signaling is a physical layer signaling; and the K2 is a positive integer.

According to one aspect of the disclosure, the above method includes:

processing a first radio signal.

Herein, the processing is transmitting, or the processing is receiving; the third signaling includes first configuration information, and the first configuration information is applicable to the first radio signal; and the first configuration information includes at least one of occupied frequency domain resources, occupied time domain resources, an MCS and a HARQ process number.

According to one aspect of the disclosure, the above method includes:

transmitting K1 first-type information group(s).

Herein, the K1 first-type information group(s) is(are) specific for K1 first-type frequency band resource(s) respectively; the K2 candidate frequency band resource(s) is(are) a subset belonging to the K1 first-type frequency band resource(s); the K1 first-type information group(s) is(are) all transmitted through an air interface; and the K1 is positive integer.

According to one aspect of the disclosure, the above method includes:

transmitting K3 second-type information group(s).

Herein, the K3 second-type information group(s) is(are) specific for the K2 candidate frequency band resource(s), and the K3 second-type information group(s) is(are) all transmitted through an air interface; and the K3 is a positive integer.

According to one aspect of the disclosure, the above method includes:

transmitting K2 first-type reference signal(s) in K2 candidate frequency band resource(s) in the second time window respectively.

Herein, a detection for the K2 first-type reference signal(s) is used for determining the K2 candidate frequency band resource(s).

According to one aspect of the disclosure, the above method includes:

performing K1 energy detection(s) for the K1 first-type frequency band resource(s) in the second time window respectively.

Herein, the K1 energy detection(s) is(are) used for determining that the K2 candidate frequency band resource(s) is(are) not occupied.

The disclosure provides a UE for wireless communication, wherein the UE includes:

a first receiver, to receive a first signaling in a first time window;

a second receiver, to receive a second signaling group in a second time window, the second signaling group being used for indicating K2 candidate frequency band resource(s); and a first transceiver, to monitor a third signaling in a second frequency band resource.

Herein, the second signaling group includes Q1 physical layer signaling(s), and the Q1 is a positive integer; the second frequency band resource is one of the K2 candidate frequency band resource(s), and a first field in the first signaling is used for determining the second frequency band resource from the K2 candidate frequency band resource(s); the first signaling is a physical layer signaling, and the third signaling is a physical layer signaling; and the K2 is a positive integer.

In one embodiment, the above UE for wireless communication is characterized in that: the first transceiver transmits a first radio signal; the third signaling includes first configuration information, and the first configuration information is applicable to the first radio signal; and the first configuration information includes at least one of occupied frequency domain resources, occupied time domain resources, an MCS and a HARQ process number.

In one embodiment, the above UE for wireless communication is characterized in that: the first transceiver receives a first radio signal; the third signaling includes first configuration information, and the first configuration information is applicable to the first radio signal; and the first configuration information includes at least one of occupied frequency domain resources, occupied time domain resources, an MCS and a HARQ process number.

In one embodiment, the above UE for wireless communication is characterized in that: the second receiver also receives K1 first-type information group(s); the K1 first-type information group(s) is(are) specific for K1 first-type frequency band resource(s) respectively; the K2 candidate frequency band resource(s) is(are) a subset belonging to the K1 first-type frequency band resource(s); the K1 first-type information group(s) is(are) all transmitted through an air interface; and the K1 is positive integer.

In one embodiment, the above UE for wireless communication is characterized in that: the second receiver also receives K3 second-type information group(s); the K3 second-type information group(s) is(are) specific for the K2 candidate frequency band resource(s), and the K3 second-type information group(s) is(are) all transmitted through an air interface; and the K3 is a positive integer.

In one embodiment, the above UE for wireless communication is characterized in that: the second receiver also detects K2 first-type reference signal(s) in the K1 first-type frequency band resource(s) in the second time window; and a detection for the K2 first-type reference signal(s) is used for determining the K2 candidate frequency band resource(s).

The disclosure provides a base station for wireless communication, wherein the base station includes:

a first transmitter, to transmit a first signaling in a first time window;

a second transceiver, to transmit a second signaling group in a second time window, the second signaling group being used for indicating K2 candidate frequency band resource(s); and a third transceiver, to transmit a third signaling in a second frequency band resource.

Herein, the second signaling group includes Q1 physical layer signaling(s), and the Q1 is a positive integer; the second frequency band resource is one of the K2 candidate frequency band resource(s), and a first field in the first signaling is used for determining the second frequency band resource from the K2 candidate frequency band resource(s); the first signaling is a physical layer signaling, and the third signaling is a physical layer signaling; and the K2 is a positive integer.

In one embodiment, the above base station for wireless communication is characterized in that: the third transceiver also transmits a first radio signal; the third signaling includes first configuration information, and the first configuration information is applicable to the first radio signal; and the first configuration information includes at least one of occupied frequency domain resources, occupied time domain resources, an MCS and a HARQ process number.

In one embodiment, the above base station for wireless communication is characterized in that: the third transceiver also receives a first radio signal; the third signaling includes first configuration information, and the first configuration information is applicable to the first radio signal; and the first configuration information includes at least one of occupied frequency domain resources, occupied time domain resources, an MCS and a HARQ process number.

In one embodiment, the above base station for wireless communication is characterized in that: the second transceiver also transmits K1 first-type information group(s); the K1 first-type information group(s) is(are) specific for K1 first-type frequency band resource(s) respectively; the K1 first-type information group(s) is(are) all transmitted through an air interface; and the K1 is positive integer.

In one embodiment, the above base station for wireless communication is characterized in that: the second transceiver also transmits K3 second-type information group(s); the K3 second-type information group(s) is(are) specific for the K2 candidate frequency band resource(s), and the K3 second-type information group(s) is(are) all transmitted through an air interface; and the K3 is a positive integer.

In one embodiment, the above base station for wireless communication is characterized in that: the second transceiver also transmits K2 first-type reference signal(s) in K2 candidate frequency band resource(s) in the second time window respectively; and a detection for the K2 first-type reference signal(s) is used for determining the K2 candidate frequency band resource(s).

In one embodiment, the above base station for wireless communication is characterized in that: the second transceiver also performs K1 energy detection(s) for the K1 first-type frequency band resource(s) in the second time window respectively; and the K1 energy detection(s) is(are) used for determining that the K2 candidate frequency band resource(s) is(are) not occupied.

In one embodiment, compared with conventional schemes, the disclosure has the following benefits.

In the disclosure, a frequency band resource corresponds to a BWP, the first signaling is used for dynamically switching the BWP, and the second signaling group in the disclosure is used for indicating which BWPs are not occupied; the first signaling and the second signaling group are simultaneously used for determining the second frequency band resource; the first signaling is generated by the base station based on the consideration of scheduling flexibility and load balance, and the second signaling group is generated based on LBT results on multiple candidate frequency band resources. The above method achieves scheduling flexibility and load balance while guaranteeing that the frequency band resource to switch to is not occupied.

The second signaling group may be transmitted on one BWP, thereby reducing the complexity of blind detection and the latency of processing of the UE.

The K1 first-type information group(s) is(are) configured for the K1 first-type frequency band resource(s) in the disclosure respectively; the K1 first-type information group(s) is(are) cell specific and will not change with the dynamic switch of BWP, which is convenient for the UE to receive and interpret, without ambiguity.

The K3 second-type information group(s) is(are) configured for the K2 candidate frequency band resource(s) in the disclosure; the K2 candidate frequency band resource(s) change(s) dynamically, and the actual candidate frequency band resource to which the K3 second-type information group(s) applies(apply) changes with the K2 candidate frequency band resource(s); the above method simplifies the design of BWP related configuration information for the UE, and can more flexibly update UE-specific higher layer configuration information.

The first-type reference signal similar to DRS helps the UE determine one step ahead the K2 candidate frequency band resource(s) already occupied by the base station, thereby reducing the complexity of reception of the UE and reducing the probability of error detection of DCI.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
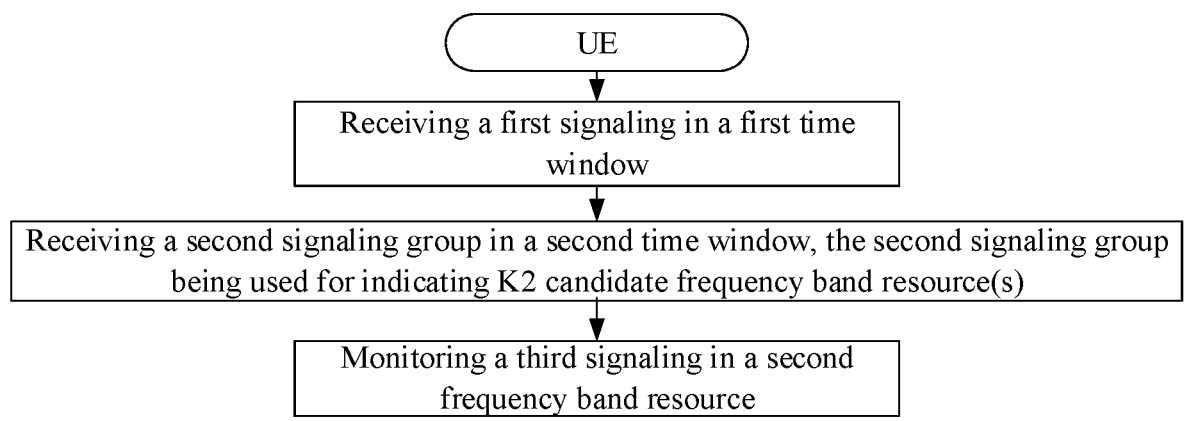
FIG. 1 is a flowchart of a first signaling according to one embodiment of the disclosure.

Embodiment 1 illustrates a flowchart of a first signaling, as shown in FIG. 1.

In Embodiment 1, the UE in the disclosure first receives a first signaling in a first time window, then receives a second signaling group in a second time window, the second signaling group being used for indicating K2 candidate frequency band resource(s), and finally monitors a third signaling in a second frequency band resource; the second signaling group includes Q1 physical layer signaling(s), and the Q1 is a positive integer; the second frequency band resource is one of the K2 candidate frequency band resource(s), and a first field in the first signaling is used for determining the second frequency band resource from the K2 candidate frequency band resource(s); the first signaling is a physical layer signaling, and the third signaling is a physical layer signaling; and the K2 is a positive integer.

In one subembodiment, the first signaling employs a given DCI format, the first field in the first signaling is one Field included in the given DCI format, and the Field is used for determining the second frequency band resource from the K2 candidate frequency band resource(s); and the Field includes a positive integer number of bit(s).

In one subembodiment, the first signaling is one given DCI, the first field in the first signaling is one bit string in the given DCI, the bit string is used for determining the second frequency band resource from the K2 candidate frequency band resource(s); and the bit string includes a positive integer number of bit(s).

In one subembodiment, the K2 is greater than 1.

In one subembodiment, the K2 is equal to 4.

In one subembodiment, the second time window is located behind the first time window in time domain.

In one subembodiment, the first time window includes T1 slot(s) in time domain, or the first time window includes T1 mini-slots in time domain, and the T1 is a positive integer.

In one affiliated embodiment of the above subembodiment, the T1 is equal to 1.

In one subembodiment, the second time window includes T2 slot(s) in time domain, or the second time window includes T2 mini-slots in time domain, and the T2 is a positive integer.

In one affiliated embodiment of the above subembodiment, the T2 is equal to 1.

In one subembodiment, any one of the Q1 physical layer signaling(s) is a physical layer signaling other than UE-specific physical layer signalings.

In one subembodiment, frequency domain resources occupied by any one of the Q1 physical layer signaling(s) belong to frequency domain resources occupied by the K2 candidate frequency bad resource(s).

In one subembodiment, the first field in the first signaling is used for indicating a reference frequency band resource from K1 first-type frequency band resource(s); if the reference frequency band resource is one of the K2 candidate frequency band resource(s), the second frequency band resource is the reference frequency band resource; if one or more subcarriers in the reference frequency band resource are located beyond the K2 candidate frequency band resource(s), an index of the second frequency band resource is related to the first field in the first signaling; the K2 candidate frequency band resource(s) is(are) a subset belonging to the K1 first-type frequency band resource(s), and the K1 is a positive integer not less than the K2.

In one affiliated embodiment of the above subembodiment, the first field in the first signaling is used for indicating the index of the second frequency band resource.

In one affiliated embodiment of the above subembodiment, the index of the second frequency band resource is an index of the second frequency band resource in the K2 candidate frequency band resource(s), and the K2 candidate frequency band resource(s) is(are) indexed with #0, #1, . . . , #(K2−1) respectively.

In one affiliated embodiment of the above subembodiment, the index of the second frequency band resource is an index of the second frequency band resource in the K1 first-type frequency band resource(s), and the K1 first-type frequency band resource(s) is(are) indexed with #0, #1, . . . , #(K1−1) respectively.

In one subembodiment, multiple candidate frequency band resources in the disclosure are arranged in an order from low to high according to center frequency points.

In one subembodiment, multiple candidate frequency band resources in the disclosure are arranged in an order from low to high according to frequency points of lowest subcarriers.

In one subembodiment, multiple candidate frequency band resources in the disclosure are arranged in an order from low to high according to frequency points of highest subcarriers.

In one subembodiment, multiple candidate frequency band resources in the disclosure are arranged in an order appearing in a configuration signaling.

In one subembodiment, multiple first-type frequency band resources in the disclosure are arranged in an order from low to high according to center frequency points.

In one subembodiment, multiple first-type frequency band resources in the disclosure are arranged in an order from low to high according to frequency points of lowest subcarriers.

In one subembodiment, multiple first-type frequency band resources in the disclosure are arranged in an order from low to high according to frequency points of highest subcarriers.

In one subembodiment, multiple first-type frequency band resources in the disclosure are arranged in an order appearing in a configuration signaling.

In one subembodiment, the Q1 is equal to 1, and the Q1 physical layer signaling is one first DCI.

In one affiliated embodiment of the above subembodiment, the first DCI is transmitted in one given candidate frequency band resource among the K2 candidate frequency band resources.

In one example of the above affiliated embodiment, the given candidate frequency band resource is a candidate frequency band resource with a lowest center frequency point among the K2 candidate frequency band resources.

In one example of the above affiliated embodiment, the given candidate frequency band resource is a candidate frequency band resource with a highest center frequency point among the K2 candidate frequency band resources.

In one example of the above affiliated embodiment, the given candidate frequency band resource is a candidate frequency band resource with a frequency point of a highest subcarrier arranged lowest among the K2 candidate frequency band resources.

In one example of the above affiliated embodiment, the given candidate frequency band resource is a candidate frequency band resource with a frequency point of a highest subcarrier arranged highest among the K2 candidate frequency band resources.

In one affiliated embodiment of the above subembodiment, the first DCI is transmitted in each of the K2 candidate frequency band resources.

In one affiliated embodiment of the above subembodiment, the first DCI indicates a first frequency domain resource, and the K2 candidate frequency resource(s) is(are) composed of all first-type frequency band resources among the K1 first-type frequency band resources that belong to the first frequency domain resource.

In one example of the above affiliated embodiment, a given first-type frequency band resource is any one of the K1 first-type frequency band resource(s); the given first-type frequency band resource includes C1 subcarriers; if there is one of the C1 subcarriers not belonging to the first frequency domain resource, the given first-type frequency band resource does not belong to the first frequency band resource.

In one example of the above affiliated embodiment, a given first-type frequency band resource is any one of the K1 first-type frequency band resource(s); the given first-type frequency band resource includes a given Resource Block (RB) set in frequency domain, and the given RB set is allocated to the UE to monitor a DCI; if frequency domain resources occupied by the given RB set all belong to the first frequency domain resource, the given first-type frequency band resource belongs to the first frequency domain resource; otherwise, the given first-type frequency band resource does not belong to the first frequency domain resource.

In one exception of the above example, the given RB set corresponds to one Control Resource Set (CORESET).

In one exception of the above example, the given RB set corresponds to one Search Space.

In one affiliated embodiment of the above subembodiment, the first DCI includes a second field, and the second field is used for indicating the K2 candidate frequency band resource(s) from the K1 first-type frequency band resource(s).

In one example of the above affiliated embodiment, the second field is one bitmap.

In one example of the above affiliated embodiment, the second field includes K1 bit(s), and the K1 bit(s) correspond(s) to the K1 first-type frequency band resource(s) respectively.

In one exception of the above example, a given bit is any one of the K1 bit(s); the given bit, when equal to 1, is used for indicating that a first-type frequency band resource corresponding to the given bit belongs to the K2 candidate frequency band resource(s); the given bit, when equal to 0, is used for indicating that a first-type frequency band resource corresponding to the given bit does not belong to the K2 candidate frequency band resource(s).

In one exception of the above example, a number of bits equal to 1 among the K1 bit(s) is not greater than the K2.

In one subembodiment, the Q1 is equal to the K2, the Q1 physical layer signaling(s) correspond(s) to K2 second DCI(s) respectively, and the K2 second DCI(s) is(are) used for indicating the K2 candidate frequency band resource(s) respectively.

In one affiliated embodiment of the above subembodiment, the K2 second DCI(s) is(are) transmitted in the K2 candidate frequency band resource(s) respectively.

In one subembodiment, any one of the Q1 physical layer signaling(s) includes a Cyclic Redundancy Check (CRC), and the CRC is scrambled with a given ID.

In one affiliated embodiment of the above subembodiment, the given ID is 16 binary bits.

In one affiliated embodiment of the above subembodiment, the given ID is a Common Control Radio Network Temporary Identifier (CC-RNTI).

In one subembodiment, any one of the Q1 physical layer signaling(s) is cell specific.

In one subembodiment, any one of the Q1 physical layer signaling(s) is terminal group specific, and the UE belongs to the terminal group.

In one subembodiment, frequency domain resources occupied by the first signaling belong to a first frequency band resource; the first frequency band resource and the second frequency band resource are orthogonal in frequency domain.

In one subembodiment, frequency domain resources occupied by the first signaling belong to the second frequency band resource.

In one subembodiment, the phrase that monitoring a third signaling in the second frequency band resource refers that: performing a blind detection of the third signaling in the second frequency band resource.

In one affiliated embodiment of the above subembodiment, the blind detection is a detection based on signature sequence.

In one affiliated embodiment of the above subembodiment, the third signaling includes a given CRC, and the CRC is scrambled with a UE-specific Radio Network Temporary Identifier (RNTI).

Embodiment 2

Figure 2:
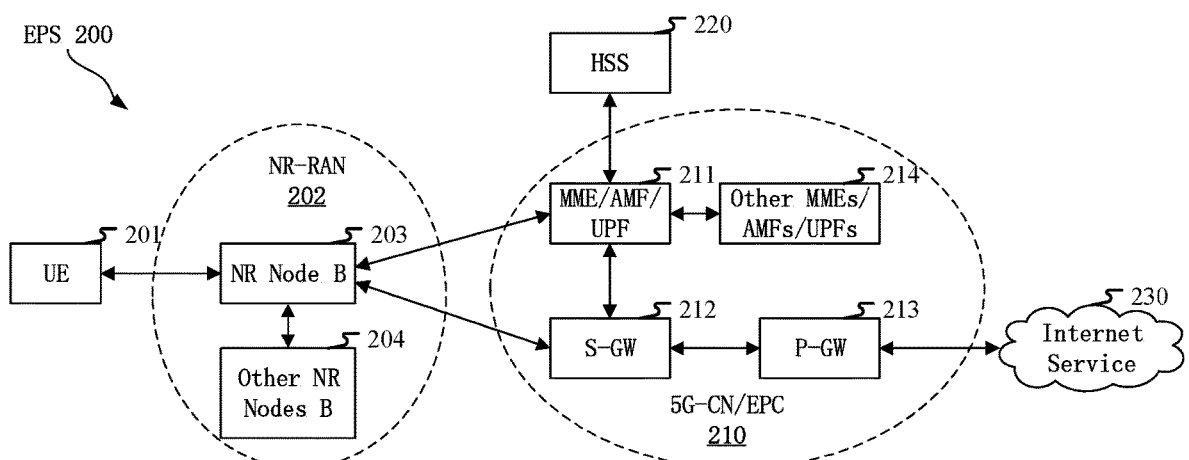
FIG. 2 is a diagram illustrating a network architecture according to one embodiment of the disclosure.

Embodiment 2 illustrates a diagram of a network architecture, as shown in FIG. 2.

Embodiment 2 illustrates an example of a diagram of a network architecture according to the disclosure, as shown in FIG. 2. FIG. 2 is a diagram illustrating a network architecture 200 of NR 5G Long-Term Evolution (LTE) and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, a 5G-Core Network/Evolved Packet Core (5G-CN/EPC) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), satellite radios, non-territorial network base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, or some other appropriate terms. The gNB 203 is connected to the 5G-CN/EPC 210 via an S1/NG interface. The 5G-CN/EPC 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one subembodiment, the UE 201 corresponds to the UE in the disclosure.

In one subembodiment, the eNB 203 corresponds to the base station in the disclosure.

In one subembodiment, the UE 201 supports wireless communication of data transmission on unlicensed spectrum.

In one subembodiment, the eNB 203 supports wireless communication of data transmission on unlicensed spectrum.

In one subembodiment, the UE 201 supports dynamic switch between multiple BWPs.

In one subembodiment, the eNB 203 supports dynamic switch between multiple BWPs.

In one subembodiment, the UE 201 supports carrier listening based on BWP.

In one subembodiment, the eNB 203 supports carrier listening based on BWP.

Embodiment 3

Figure 3:
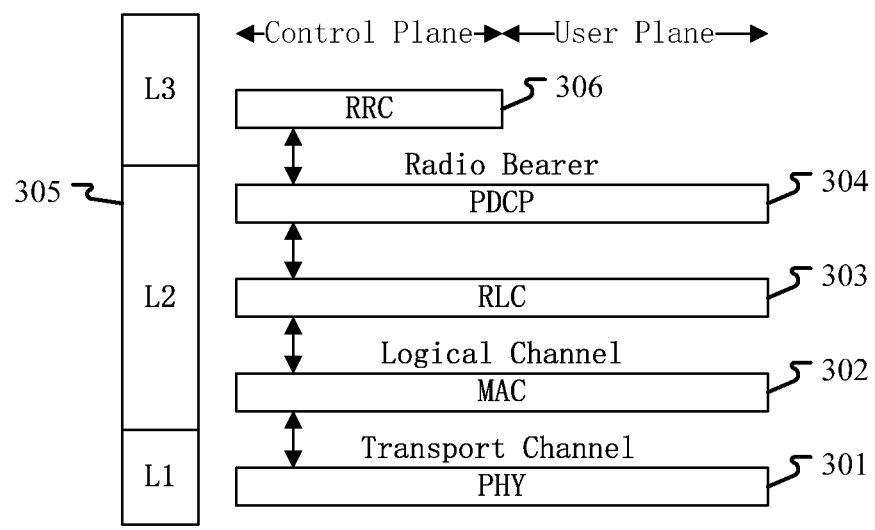
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is represented by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one subembodiment, the radio protocol architecture shown in FIG. 3 is applicable to the UE in the disclosure.

In one subembodiment, the radio protocol architecture shown in FIG. 3 is applicable to the base station in the disclosure.

In one subembodiment, the first signaling in the disclosure is generated on the PHY 301.

In one subembodiment, the second signaling in the disclosure is generated on the PHY 301.

In one subembodiment, the third signaling in the disclosure is generated on the PHY 301.

In one subembodiment, the first radio signal in the disclosure is generated on the PHY 301.

In one subembodiment, the K1 first-type information group(s) in the disclosure is(are) generated on the RRC sublayer 306.

In one subembodiment, the K3 second-type information group(s) in the disclosure is(are) generated on the RRC sublayer 306.

Embodiment 4

Figure 4:
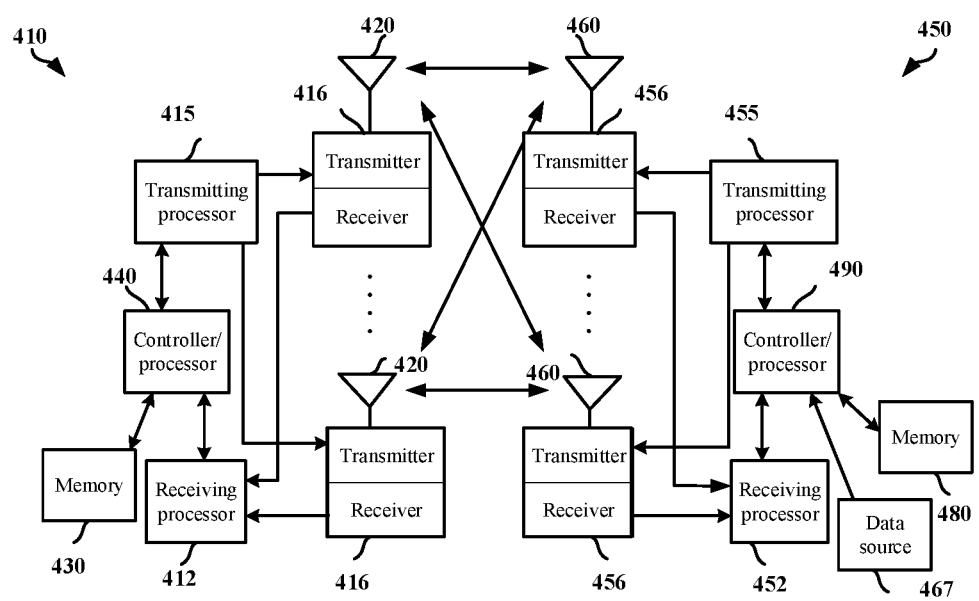
FIG. 4 is a diagram illustrating an eNB and a UE according to one embodiment of the disclosure.

Embodiment 4 illustrates a diagram of a base station and a UE according to the disclosure, as shown in FIG. 4. FIG. 4 is a block diagram of a gNB 410 in communication with a UE 450 in an access network.

The base station 410 includes a controller/processor 440, a memory 430, a receiving processor 412, a transmitting processor 415, a transmitter/receiver 416 and an antenna 420.

The UE 450 includes a controller/processor 490, a memory 480, a data source 467, a transmitting processor 455, a receiving processor 452, a transmitter/receiver 456 and an antenna 460.

In UL transmission, processes relevant to the base station 410 include the following.

The receiver 416 receives a radio-frequency signal received via the corresponding antenna 420, converts the received radio-frequency signal into a baseband signal and provides the baseband signal to the receiving processor 412.

The receiving processor 412 performs various signal receiving processing functions of an L1 layer (that is, PHY), including decoding, de-interleaving, descrambling, demodulation, extraction of physical layer control signaling, etc.

The receiving processor 412 performs various signal receiving processing functions of an L1 layer (that is, PHY), including multiantenna receiving, despreading, code division multiplexing, precoding, etc.

The controller/processor 440 performs functions of L2 layer, and is connected to the memory 430 that stores program code and data.

The controller/processor 440 provides de-multiplexing between a logical channel and a transport channel, packet reassembling, decryption, header decompression and control signaling processing to recover a higher-layer packet coming from the UE 450. The higher-layer packet coming from the controller/processor 440 may be provided to the core network.

In Uplink (UL) transmission, processes relevant to the UE 450 include the following.

The data source 467 provides a higher-layer packet to the controller/processor 490. The data source 467 represents all protocol layers above L2 layer.

The transmitter 456 transmits a radio-frequency signal via the corresponding antenna 460, converts a baseband signal into a radio-frequency signal and provides the radio-frequency radio to the corresponding antenna 460.

The transmitting processor 455 performs various signal receiving processing functions of an L1 layer (that is, PHY), including encoding, interleaving, scrambling, modulation and generation of physical layer control signalings, etc.

The transmitting processor 455 performs various signal receiving processing functions of an L1 layer (that is, PHY), including multiantenna transmitting, spreading, code division multiplexing, precoding, etc.

The controller/processor 490 provides header compression, encryption, packet segmentation and reordering, multiplexing between a logical channel and a transport channel based on radio resource allocation of the gNB 410, to implement the L2 functions used for the user plane and the control plane.

The controller/processor 459 is also in charge of HARQ operation, retransmission of lost packets, and signalings to the gNB 410.

In Downlink (DL) transmission, processes relevant to the base station 410 include the following.

A higher-layer packet is provided to the controller/processor 440. The controller/processor 440 provides header compression, encryption, packet segmentation and reordering, multiplexing and de-multiplexing between a logical channel and a transport channel, to implement L2 protocols used for the user plane and the control plane. The higher-layer packet may include data or control information, for example, Downlink Shared Channel (DL-SCH).

The controller/processor 440 is connected to the memory 430 that stores program codes and data. The memory 430 may be a computer readable medium.

The controller/processor 440 includes a scheduling unit for transmission requirements, and the scheduling unit is configured to schedule air interface resources corresponding to transmission requirements.

The transmitting processor 415 receives a bit stream output from the controller/processor 440, and performs various signal transmitting processing functions of L1 layer (that is, PHY), including encoding, interleaving, scrambling, modulation, power control/allocation, generation of physical layer control signalings (including PBCH, PDCCH, PHICH, PCFICH, reference signal), etc.

The transmitting processor 415 receives a bit stream output from the controller/processor 440, and performs various signal transmitting processing functions of L1 layer (that is, PHY), including multiantenna transmitting, spreading, code division multiplexing, precoding, etc.

The transmitter 416 is configured to convert the baseband signal provided by the transmitting processor 441 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In Downlink (DL) transmission, processes relevant to the UE 450 include the following.

The receiver 456 is configured to convert a radio-frequency signal received via the antenna 460 into a baseband signal and provide the baseband signal to receiving processor 452.

The receiving processor 452 performs various signal receiving processing functions of an L1 layer (that is, PHY), including decoding, de-interleaving, descrambling, demodulation, extraction of physical layer control signaling, etc.

The receiving processor 452 performs various signal receiving processing functions of an L1 layer (that is, PHY), including multiantenna receiving, despreading, code division multiplexing, precoding, etc.

The controller/processor 490 receives a bit stream output from the receiving processor 452, and provides header decompression, decryption, packet segmentation and reordering, multiplexing and de-multiplexing between a logical channel and a transport channel, to implement L2 protocols used for the user plane and the control plane.

The controller/processor 490 is connected to the memory 480 that stores program codes and data. The memory 480 may be a computer readable medium.

In one subembodiment, the UE 450 includes at least one processor and at least one memory. The at least one memory includes computer program codes. The at least one memory and the computer program codes are configured to be used in collaboration with the at least one processor. The UE 450 at least first receives a first signaling in a first time window, then receives a second signaling group in a second time window, the second signaling group being used for indicating K2 candidate frequency band resource(s), and finally monitors a third signaling in a second frequency band resource; the second signaling group includes Q1 physical layer signaling(s), and the Q1 is a positive integer; the second frequency band resource is one of the K2 candidate frequency band resource(s), and a first field in the first signaling is used for determining the second frequency band resource from the K2 candidate frequency band resource(s); the first signaling is a physical layer signaling, and the third signaling is a physical layer signaling; and the K2 is a positive integer.

In one subembodiment, the UE 450 includes a memory that stores a computer readable instruction program. The computer readable instruction program generates an action when executed by at least one processor. The action includes: first receiving a first signaling in a first time window, then receiving a second signaling group in a second time window, the second signaling group being used for indicating K2 candidate frequency band resource(s), and finally monitoring a third signaling in a second frequency band resource; the second signaling group includes Q1 physical layer signaling(s), and the Q1 is a positive integer; the second frequency band resource is one of the K2 candidate frequency band resource(s), and a first field in the first signaling is used for determining the second frequency band resource from the K2 candidate frequency band resource(s); the first signaling is a physical layer signaling, and the third signaling is a physical layer signaling; and the K2 is a positive integer.

In one subembodiment, the gNB 410 device includes at least one processor and at least one memory. The at least one memory includes computer program codes. The at least one memory and the computer program codes are configured to be used in collaboration with the at least one processor. The gNB 410 at least first transmits a first signaling in a first time window, then transmits a second signaling group in a second time window, the second signaling group being used for indicating K2 candidate frequency band resource(s), and finally transmits a third signaling in a second frequency band resource; the second signaling group includes Q1 physical layer signaling(s), and the Q1 is a positive integer; the second frequency band resource is one of the K2 candidate frequency band resource(s), and a first field in the first signaling is used for determining the second frequency band resource from the K2 candidate frequency band resource(s); the first signaling is a physical layer signaling, and the third signaling is a physical layer signaling; and the K2 is a positive integer.

In one embodiment, the gNB 410 includes a memory that stores a computer readable instruction program. The computer readable instruction program generates an action when executed by at least one processor. The action includes: first transmitting a first signaling in a first time window, then transmitting a second signaling group in a second time window, the second signaling group being used for indicating K2 candidate frequency band resource(s), and finally transmitting a third signaling in a second frequency band resource; the second signaling group includes Q1 physical layer signaling(s), and the Q1 is a positive integer; the second frequency band resource is one of the K2 candidate frequency band resource(s), and a first field in the first signaling is used for determining the second frequency band resource from the K2 candidate frequency band resource(s); the first signaling is a physical layer signaling, and the third signaling is a physical layer signaling; and the K2 is a positive integer.

In one subembodiment, the UE 450 corresponds to the UE in the disclosure.

In one subembodiment, the gNB 410 corresponds to the base station in the disclosure.

In one subembodiment, at least the former two of the receiver 456, the receiving processor 452 and the controller/processor 490 are used for receiving a first signaling in a first time window.

In one subembodiment, at least the former two of the receiver 456, the receiving processor 452 and the controller/processor 490 are used for receiving a second signaling group in a second time window, the second signaling group being used for indicating K2 candidate frequency band resource(s).

In one subembodiment, at least the former two of the receiver 456, the receiving processor 452 and the controller/processor 490 are used for monitoring a third signaling in a second frequency band resource.

In one subembodiment, at least the former two of the receiver 456, the receiving processor 452 and the controller/processor 490 are used for receiving a first radio signal.

In one subembodiment, at least the former two of the transmitter 456, the transmitting processor 455 and the controller/processor 490 are used for transmitting a first radio signal.

In one subembodiment, at least the former two of the receiver 456, the receiving processor 452 and the controller/processor 490 are used for receiving K1 first-type information group(s).

In one subembodiment, at least the former two of the receiver 456, the receiving processor 452 and the controller/processor 490 are used for receiving K3 second-type information group(s).

In one subembodiment, at least the former two of the receiver 456, the receiving processor 452 and the controller/processor 490 are used for detecting K2 first-type reference signal(s) in the K1 first-type frequency band resource(s) in the second time window.

In one subembodiment, at least the former two of the transmitter 416, the transmitting processor 415 and the controller/processor 440 are used for transmitting a first signaling in a first time window.

In one subembodiment, at least the former two of the transmitter 416, the transmitting processor 415 and the controller/processor 440 are used for transmitting a second signaling group in a second time window, the second signaling group being used for indicating K2 candidate frequency band resource(s).

In one subembodiment, at least the former two of the transmitter 416, the transmitting processor 415 and the controller/processor 440 are used for transmitting a third signaling in a second frequency band resource.

In one subembodiment, at least the former two of the transmitter 416, the transmitting processor 415 and the controller/processor 440 are used for transmitting a first radio signal.

In one subembodiment, at least the former two of the receiver 416, the receiving processor 412 and the controller/processor 440 are used for receiving a first radio signal.

In one subembodiment, at least the former two of the transmitter 416, the transmitting processor 415 and the controller/processor 440 are used for transmitting K1 first-type information group(s).

In one subembodiment, at least the former two of the transmitter 416, the transmitting processor 415 and the controller/processor 440 are used for transmitting K3 second-type information group(s).

In one subembodiment, at least the former two of the transmitter 416, the transmitting processor 415 and the controller/processor 440 are used for transmitting K2 first-type reference signal(s) in K2 candidate frequency band resource(s) in the second time window respectively.

In one subembodiment, at least the former two of the receiver 416, the receiving processor 412 and the controller/processor 440 are used for performing K1 energy detection(s) for the K1 first-type frequency band resource(s) in the second time window respectively;

Embodiment 5

Figure 5:
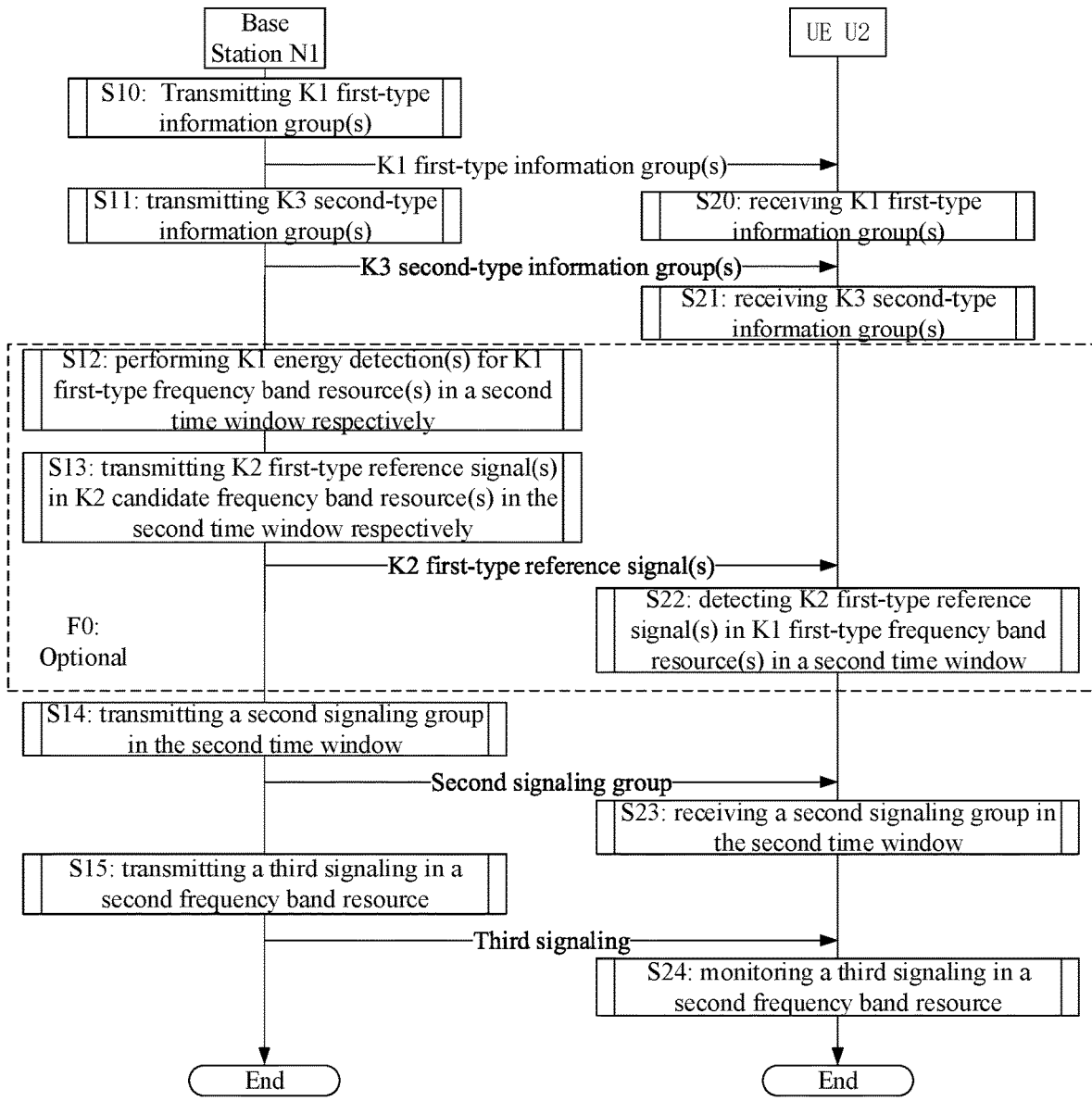
FIG. 5 is a flowchart of a second signaling group according to one embodiment of the disclosure.

Embodiment 5 illustrates a flowchart of a second radio signal, as shown in FIG. 5. In FIG. 5, a base station N1 is a maintenance base station for a serving cell of a UE U2. In FIG. 5, steps in box F0 are optional.

The base station N1 transmits K1 first-type information group(s) in S10, transmits K3 second-type information group(s) in S11, transmits a first signaling in a first time window in S12, performs K1 energy detection(s) for K1 first-type frequency band resource(s) in a second time window respectively in S13, transmits K2 first-type reference signal(s) in K2 candidate frequency band resource(s) in the second time window respectively in S14, transmits a second signaling group in the second time window in S15, the second signaling group being used for indicating K2 candidate frequency band resource(s), and transmits a third signaling in a second frequency band resource in S16.

The UE U2 receives K1 first-type information group(s) in S20, receives K3 second-type information group(s) in S21, receives a first signaling in a first time window in S22, detects K2 first-type reference signal(s) in K1 first-type frequency band resource(s) in a second time window in S23, receives a second signaling group in the second time window in S24, the second signaling group being used for indicating K2 candidate frequency band resource(s), and monitors a third signaling in a second frequency band resource in S25.

In Embodiment 5, the second signaling group includes Q1 physical layer signaling(s), and the Q1 is a positive integer; the second frequency band resource is one of the K2 candidate frequency band resource(s), and a first field in the first signaling is used for determining the second frequency band resource from the K2 candidate frequency band resource(s); the first signaling is a physical layer signaling, and the third signaling is a physical layer signaling; the K2 is a positive integer; the K1 first-type information group(s) is(are) specific for K1 first-type frequency band resource(s) respectively; the K2 candidate frequency band resource(s) is(are) a subset belonging to the K1 first-type frequency band resource(s); the K1 first-type information group(s) is(are) all transmitted through an air interface; the K1 is positive integer; the K3 second-type information group(s) is(are) specific for the K2 candidate frequency band resource(s), and the K3 second-type information group(s) is(are) all transmitted through an air interface; the K3 is a positive integer; and a detection for the K2 first-type reference signal(s) is used for determining the K2 candidate frequency band resource(s).

In one subembodiment, the air interface in the disclosure corresponds to the interface between the UE 201 and the NR Node B 203 illustrated in Embodiment 2.

In one subembodiment, the air interface in the disclosure is carried by a wireless channel.

In one subembodiment, any one of the K1 first-type information group(s) includes M1 piece(s) of first-type information, and the M1 is a positive integer.

In one subembodiment, the K1 first-type information group(s) is(are) one-to-one corresponding to the K1 first-type frequency band resource(s) respectively.

In one subembodiment, a given first-type information group is any one of the K1 first-type information group(s), and the given first-type information group is specific for a given candidate frequency band resource among the K1 first-type frequency band resource(s); and the given first-type information group is used for configuring a given CORESET in the given candidate frequency band resource.

In one affiliated embodiment of the above subembodiment, the given first-type information group corresponds to a PDCCH-Config Information Element (IE) in TS 38.331.

In one affiliated embodiment of the above subembodiment, the given first-type information group is cell specific.

In one example of the above affiliated embodiment, the K1 first-type frequency band resource(s) belong(s) to frequency domain resources corresponding to one same cell.

In one affiliated embodiment of the above subembodiment, the given first-type information group includes a reg-BundleSize used for indicating the given CORESET; and the reg-BundleSize can refer to the definition of the PDCCH-Config IE in TS 38.331.

In one affiliated embodiment of the above subembodiment, the given first-type information group includes a cce-reg-MappingType used for indicating the given CORESET; and the cce-reg-MappingType can refer to the definition of the PDCCH-Config IE in TS 38.331.

In one affiliated embodiment of the above subembodiment, the given first-type information group includes an interleaverRows used for indicating the given CORESET; and the interleaverRows can refer to the definition of the PDCCH-Config IE in TS 38.331.

In one subembodiment, the K1 first-type frequency band resource(s) correspond(s) to K1 BWP(s) respectively.

In one affiliated embodiment of the above subembodiment, the K1 BWPs employ K1 different subcarrier spacings respectively.

In one affiliated embodiment of the above subembodiment, the K1 first-type frequency band resources all belong to one same system bandwidth.

In one affiliated embodiment of the above subembodiment, the K1 first-type frequency band resources all correspond to one same Physical Cell Identity (PCID).

In one affiliated embodiment of the above subembodiment, the K1 first-type frequency band resources all correspond to frequency domain resources occupied by one same serving cell.

In one affiliated embodiment of the above subembodiment, any one of the K1 first-type frequency band resource(s) occupies a positive integer number of consecutive Physical Resource Blocks (RBs) in frequency domain.

In one subembodiment, any one of the K1 first-type information group(s) is cell specific.

In one subembodiment, any one of the K3 second-type information group(s) is UE U2 specific.

In one subembodiment, any one of the K3 second-type information group(s) includes M2 piece(s) of first-type information, and the M2 is a positive integer.

In one subembodiment, the phrase that the K3 second-type information group(s) is(are) specific for the K2 candidate frequency band resource(s) refers that: the K3 second-type information group(s) is(are) specific for K3 candidate frequency band resource(s) among the K2 candidate frequency band resource(s) respectively; and the K3 is a positive integer not greater than the K2.

In one affiliated embodiment of the above subembodiment, the K3 candidate frequency band resource(s) is(are) K3 candidate frequency band resource(s) with a lowest center frequency point among the K2 candidate frequency band resources.

In one affiliated embodiment of the above subembodiment, the K3 candidate frequency band resource(s) is(are) K3 candidate frequency band resource(s) with a highest center frequency point among the K2 candidate frequency band resources.

In one affiliated embodiment of the above subembodiment, the K3 candidate frequency band resource(s) is(are) K3 candidate frequency band resource(s) with a frequency point of a highest subcarrier arranged lowest among the K2 candidate frequency band resources.

In one affiliated embodiment of the above subembodiment, the K3 candidate frequency band resource(s) is(are) K3 candidate frequency band resource(s) with a frequency point of a highest subcarrier arranged highest among the K2 candidate frequency band resources.

In one affiliated embodiment of the above subembodiment, the K3 is equal to the K2, and the K3 second-type information group(s) is(are) one-to-one corresponding to the K3 candidate frequency band resource(s).

In one affiliated embodiment of the above subembodiment, the K3 is fixed, or the K3 is configured through a higher layer signaling.

In one subembodiment, the phrase that the K3 second-type information group(s) is(are) specific for the K2 candidate frequency band resource(s) refers that: the K3 second-type information group(s) is(are) all applicable to the K2 candidate frequency band resource(s).

In one affiliated embodiment of the above subembodiment, the K3 second-type information group(s) is(are) K3 piece(s) of second-type information respectively.

In one affiliated embodiment of the above subembodiment, the K3 second-type information group(s) include(s) first target information, and the first target information is used for indicating a DCI format supported by the K2 candidate frequency band resource(s).

In one affiliated embodiment of the above subembodiment, the K3 second-type information group(s) include(s) second target information, and the second target information is used for indicating a number of Physical Downlink Control Channel (PDCCH) candidates included in the K2 candidate frequency band resource(s).

In one subembodiment, a target second-type information group is any one of the K3 second-type information group(s), and the target second-type information group is specific for a target virtual frequency band resource among K3 virtual frequency band resource(s); the target second-type information group is used for configuring a target CORESET in the target virtual frequency band resource.

In one affiliated embodiment of the above subembodiment, the K3 virtual frequency band resource(s) is(are) K3 candidate frequency band resource(s) among the K2 candidate frequency band resource(s) in the second time window respectively; and the K3 is a positive integer not greater than the K2.

In one example of the above affiliated embodiment, the K3 virtual frequency band resource(s) is(are) K3 target frequency band resource(s) in a third time window respectively; the third time window is orthogonal to the second time window in time domain; and at least one of the K3 target frequency band resource(s) does not belong to the K3 candidate frequency band resource(s).

In one affiliated embodiment of the above subembodiment, the target second-type information group corresponds to a PDCCH-Config IE in TS 38.331.

In one example of the above affiliated embodiment, the K2 virtual frequency band resource(s) belong(s) to frequency domain resources corresponding to one same cell.

In one affiliated embodiment of the above subembodiment, the target second-type information group includes a frequencyDomainResources used for indicating the target CORESET, and the frequencyDomainResources can refer to the definition of PDCCH-Config IE in TS 38.331.

In one affiliated embodiment of the above subembodiment, the target second-type information group includes a startSymbol used for indicating the target CORESET, and the startSymbol can refer to the definition of PDCCH-Config IE in TS 38.331.

In one affiliated embodiment of the above subembodiment, the target second-type information group includes a tci-StateRefId used for indicating the target CORESET, and the tci-StateRefId can refer to the definition of PDCCH-Config IE in TS 38.331.

In one affiliated embodiment of the above subembodiment, the target second-type information group includes a pdcch-DMRS-ScramblingID used for indicating the target CORESET, and the pdcch-DMRS-ScramblingID can refer to the definition of PDCCH-Config IE in TS 38.331.

In one affiliated embodiment of the above subembodiment, the target second-type information group includes an Aggregation Level supported by the target CORESET and a number of candidates corresponding to the Aggregation Level.

In one affiliated embodiment of the above subembodiment, the target second-type information group includes a DCI format supported by the target CORESET.

In one subembodiment, any one of the K2 first-type reference signal(s) includes a Discovery Reference Signal (DRS).

In one subembodiment, any one of the K2 first-type reference signal(s) includes a Secondary Synchronization Signal (SSS).

In one subembodiment, any one of the K2 first-type reference signal(s) includes a Synchronization Signal Block (SSB).

In one subembodiment, the UE U2 acquires K1 first-type received quality(qualities) in K1 first-type time-frequency resource set(s) in the K1 first-type frequency band resource(s) respectively; the K2 first-type reference signal(s) occupies(occupy) K2 second-type time-frequency resource set(s), and the K2 second-type time-frequency resource set(s) are located in the K2 candidate frequency band resource(s) respectively.

In one affiliated embodiment of the above subembodiment, any one of the K1 first-type received quality(qualities) includes a received energy.

In one affiliated embodiment of the above subembodiment, any one of the K1 first-type received quality(qualities) includes a Reference Signal Received Power (RSRP).

In one affiliated embodiment of the above subembodiment, any one of the K1 first-type received quality(qualities) includes a Reference Signal Received Quality (RSRQ).

In one affiliated embodiment of the above subembodiment, any one of the K1 first-type received quality(qualities) includes a Received Signal Strength Indicator (RSSI).

In one affiliated embodiment of the above subembodiment, any one of the K1 first-type received quality(qualities) includes a Signal to Noise Rate (SNR).

In one affiliated embodiment of the above subembodiment, any one of the K1 first-type received quality(qualities) includes a Signal to Inference Plus Noise Rate (SINR).

In one affiliated embodiment of the above subembodiment, the UE U2 detects the K2 first-type reference signal(s) in the K2 second-type time-frequency resource set(s), and the UE determines that frequency band resources occupied by the K2 second-type time-frequency resource set(s) correspond to the K2 candidate frequency band resource(s) respectively.

In one affiliated embodiment of the above subembodiment, energy(energies) received by the UE U2 in the K2 second-type time-frequency resource set(s) is(are) K2 maximum ones received among the K1 first-type time-frequency resource set(s), and the UE U2 determines that frequency band resources occupied by the K2 second-type time-frequency resource set(s) correspond to the K2 candidate frequency band resource(s) respectively.

In one subembodiment, the UE U2 performs a blind detection of the K2 first-type reference signal(s) in the K1 first-type frequency band resource(s) in the second time window.

In one affiliated embodiment of the above subembodiment, the blind detection is an energy detection.

In one affiliated embodiment of the above subembodiment, the blind detection is a signature sequence detection.

In one affiliated embodiment of the above subembodiment, the blind detection is a correlation detection.

In one subembodiment, the K1 energy detection(s) include(s) K2 candidate energy detection(s), the K2 candidate energy detection(s) is(are) performed by the base station N1 in the K2 candidate frequency band resource(s) respectively, and the K2 candidate energy detection(s) indicate(s) that the K2 candidate frequency band resource(s) is(are) not occupied respectively.

In one subembodiment, any one of the K1 energy detection(s) is an LBT process.

In one subembodiment, any one of the K1 energy detection(s) is a Clear Channel Assessment (CCA) process.

Embodiment 6

Figure 6:
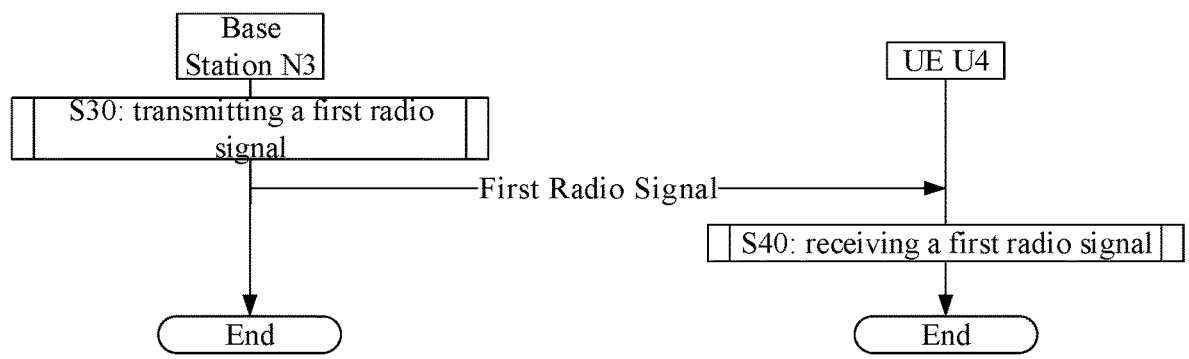
FIG. 6 is a flowchart of a first radio signal according to one embodiment of the disclosure.

Embodiment 6 illustrates a flowchart of a first radio signal, as shown in FIG. 6. In FIG. 6, a base station N3 is a maintenance base station for a serving cell of a UE U4.

The base station N3 transmits a first radio signal in S30.

The UE U4 receives a first radio signal in S40.

In Embodiment 6, the third signaling in the disclosure includes first configuration information, and the first configuration information is applicable to the first radio signal; and the first configuration information includes at least one of occupied frequency domain resources, occupied time domain resources, an MCS and a HARQ process number.

In one subembodiment, the third signaling is a downlink grant.

In one affiliated embodiment of the above subembodiment, a physical layer channel occupied by the first radio signal is a Physical Downlink Shared Channel (PDSCH).

In one affiliated embodiment of the above subembodiment, a transmission layer channel occupied by the first radio signal is a Downlink Shared Channel (DL-SCH).

Embodiment 7

Figure 7:
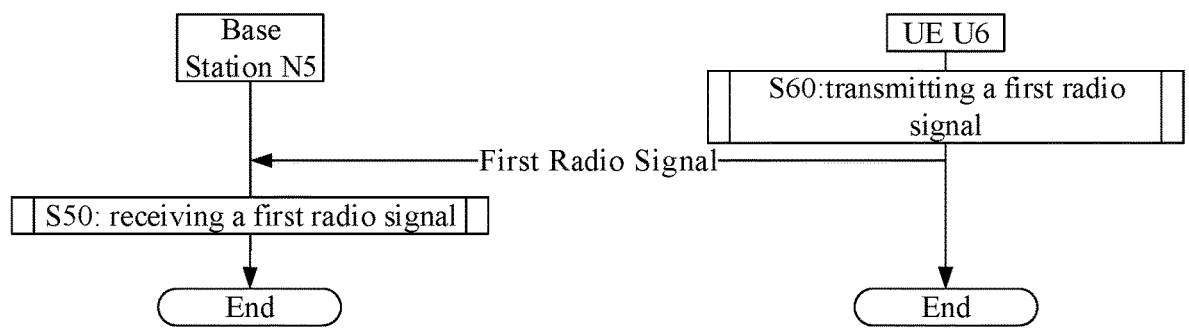
FIG. 7 is a flowchart of a first radio signal according to another embodiment of the disclosure.

Embodiment 7 illustrates another flowchart of a first radio signal, as shown in FIG. 7. In FIG. 6, a base station N5 is a maintenance base station for a serving cell of a UE U6.

The base station N5 receives a first radio signal in S50.

The UE U6 transmits a first radio signal in S60.

In Embodiment 7, the third signaling in the disclosure includes first configuration information, and the first configuration information is applicable to the first radio signal; and the first configuration information includes at least one of occupied frequency domain resources, occupied time domain resources, an MCS and a HARQ process number.

In one subembodiment, the third signaling is an uplink grant.

In one affiliated embodiment of the above subembodiment, a physical layer channel occupied by the first radio signal is a Physical Uplink Shared Channel (PUSCH).

In one affiliated embodiment of the above subembodiment, a transmission layer channel occupied by the first radio signal is an Uplink Shared Channel (UL-SCH).

Embodiment 8

Figure 8:
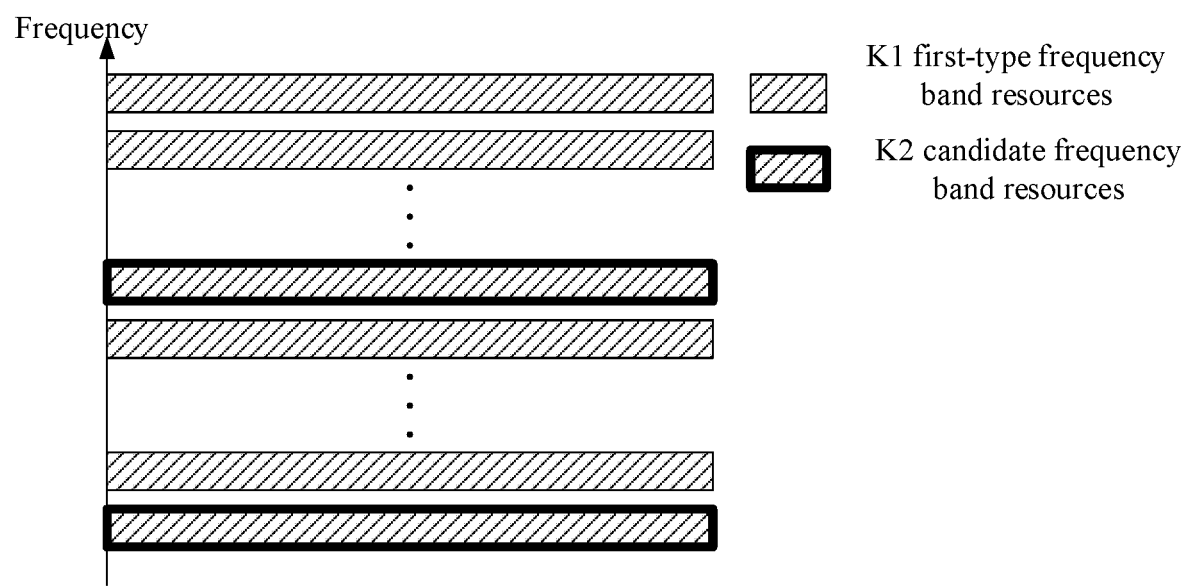
FIG. 8 is a diagram illustrating K2 candidate frequency band resources according to one embodiment of the disclosure.

Embodiment 8 illustrates a diagram of K2 candidate frequency band resources, as shown in FIG. 8. In FIG. 8, each bold-line rectangle filled with slashes represents the K2 candidate frequency band resources in the disclosure, and each rectangle filled with slashes represents the K1 first-type frequency band resources in the disclosure.

In one subembodiment, any two different candidate frequency band resources among the K2 candidate frequency band resources are orthogonal in frequency domain.

In one subembodiment, any two different first-type frequency band resources among the K1 first-type frequency band resources are orthogonal in frequency domain.

In one subembodiment, the K1 first-type frequency band resources all belong to a system bandwidth, and any one of the K1 first-type frequency band resources has a fixed frequency-domain position in the system bandwidth.

In one subembodiment, the K1 first-type frequency band resources all belong to a system bandwidth, and any one of the K1 first-type frequency band resources keeps an unchanged frequency-domain position in the system bandwidth within one RRC signaling configuration periodicity.

In one subembodiment, frequency-domain positions of the K2 candidate frequency band resources in the K1 first-type frequency band resources change dynamically.

In one subembodiment, the base station in the disclosure determines the K2 candidate frequency band resources from the K1 first-type frequency band resources through a channel detection.

Embodiment 9

Figure 9:
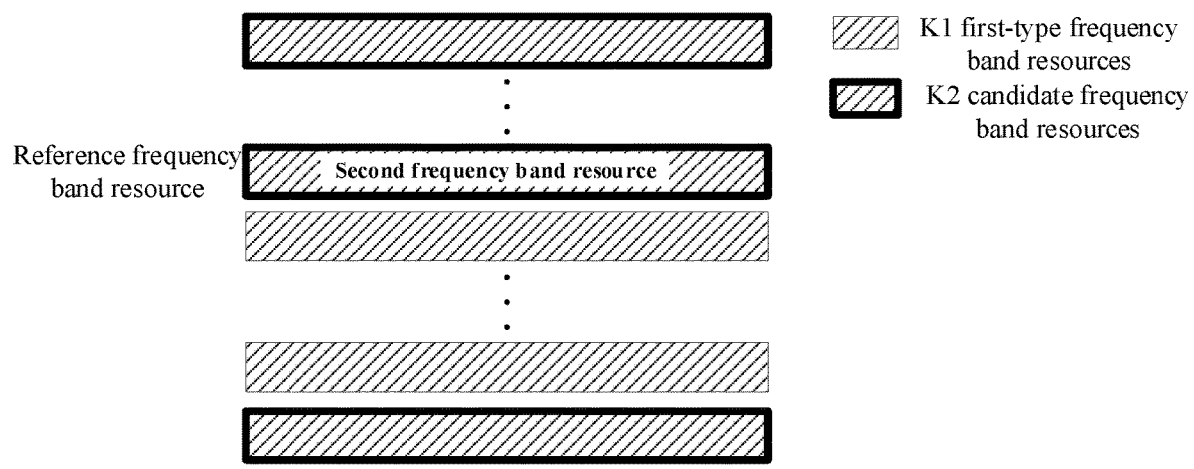
FIG. 9 is a diagram illustrating a first field in a first signaling and a second frequency band resource according to one embodiment of the disclosure.

Embodiment 9 illustrates a diagram of a first field in a first signaling and a second frequency band resource, as shown in FIG. 9. In FIG. 9, the first field in the first signaling indicates a reference frequency band resource, the reference frequency band resource belongs to the K2 candidate frequency band resources, and the reference frequency band resource is the second frequency band resource in the disclosure.

In one subembodiment, the first field in the first signaling is used for indicating the reference frequency band resource from the K1 first-type frequency band resources in the disclosure.

Embodiment 10

Figure 10:
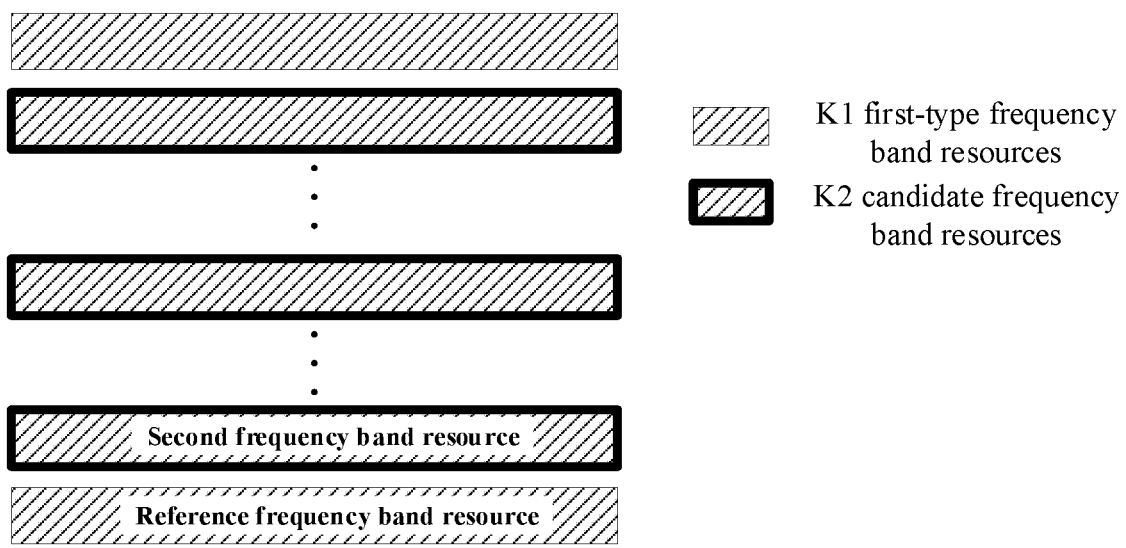
FIG. 10 is a diagram illustrating a first field in a first signaling and a second frequency band resource according to another embodiment of the disclosure.

Embodiment 10 illustrates another diagram of a first field in a first signaling and a second frequency band resource, as shown in FIG. 10. In FIG. 10, the first field in the first signaling indicates a reference frequency band resource, the reference frequency band resource does not belong to the K2 candidate frequency band resources, and an index of the reference frequency band resource is related to an index of the second frequency band resource in the disclosure.

In one subembodiment, the index of the reference frequency band resource is an index of the reference frequency band resource in the K1 first-type frequency band resources.

In one subembodiment, the index of the second frequency band resource is an index of the second frequency band resource in the K2 candidate frequency band resources.

In one subembodiment, the index of the reference frequency band resource is #L1, and the L1 is an integer in a range from 0 to (K1-1); the index of the second frequency band resource is #L2, and the L2 is an integer in a range from 0 to (K2-1); and the L2 is equal to a remainder of the L1 modulo the K2.

Embodiment 11

Figure 11:
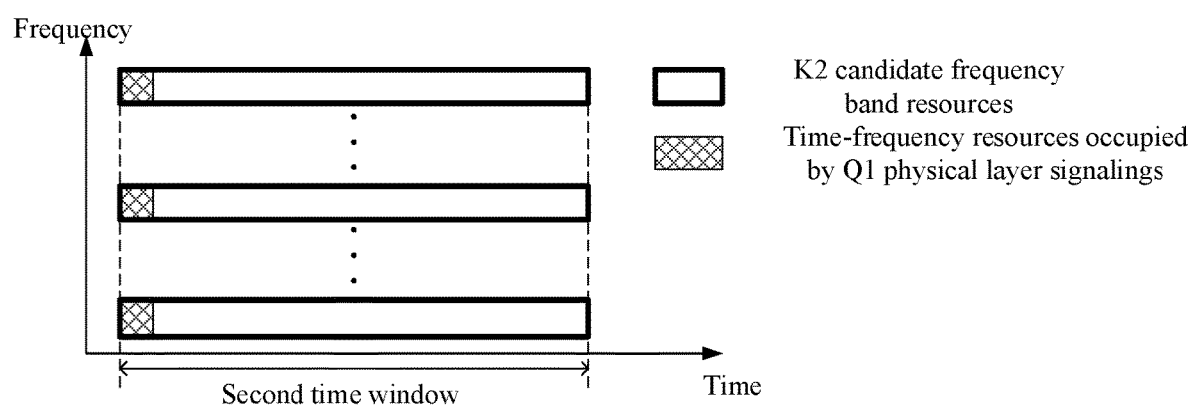
FIG. 11 is a diagram illustrating a second signaling group according to one embodiment of the disclosure.

Embodiment 11 illustrates a diagram of a second signaling group, as shown in FIG. 11. In FIG. 11, the second signaling group includes Q1 physical layer signalings, the Q1 is equal to the K2 in the disclosure, and the Q1 physical layer signalings are transmitted in the K2 candidate frequency band resources respectively.

In one subembodiment, CRCs included in the Q1 physical layer signalings are all scrambled with a CC-RNTI.

In one subembodiment, the Q1 changes with the dynamic change of the K2.

In one subembodiment, the Q1 physical layer signalings are used for indicating that the K2 candidate frequency band resources are occupied by the base station in the disclosure respectively.

Embodiment 12

Figure 12:
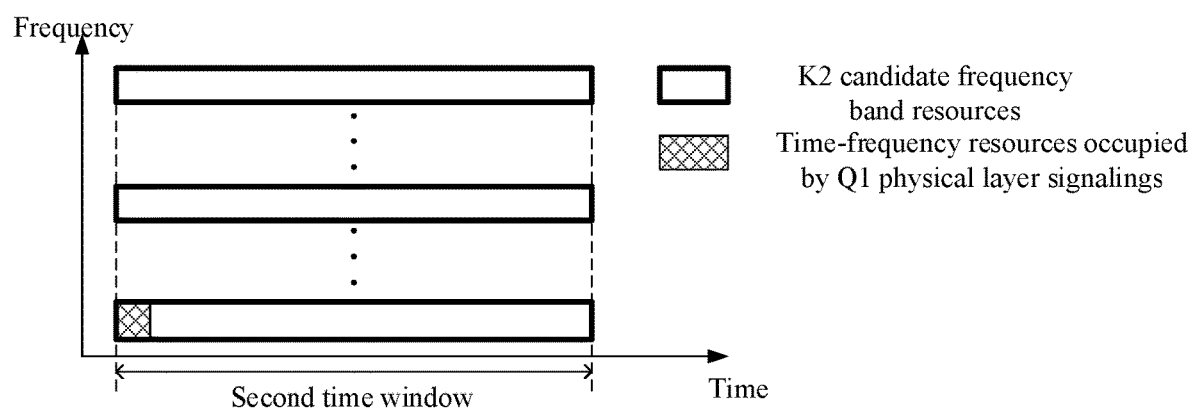
FIG. 12 is a diagram illustrating a second signaling group according to another embodiment of the disclosure.

Embodiment 12 illustrates another diagram of a second signaling group, as shown in FIG. 12. In FIG. 12, the second signaling group includes Q1 physical layer signalings, the Q1 physical layer signalings are transmitted in Q1 candidate frequency band resources among the K2 candidate frequency band resources, and the Q1 is a positive integer less than the K2.

In one subembodiment, the Q1 is equal to 1, and the second signaling group is transmitted in one of the K2 candidate frequency band resources.

In one affiliated embodiment of the above subembodiment, the candidate frequency band resource transmitting the second signaling group is a candidate frequency band resource with a lowest center frequency point among the K2 candidate frequency band resources.

In one affiliated embodiment of the above subembodiment, the candidate frequency band resource transmitting the second signaling group is a candidate frequency band resource with a highest center frequency point among the K2 candidate frequency band resources.

In one affiliated embodiment of the above subembodiment, the candidate frequency band resource transmitting the second signaling group is a candidate frequency band resource with a frequency point of a highest subcarrier arranged lowest among the K2 candidate frequency band resources.

In one affiliated embodiment of the above subembodiment, the candidate frequency band resource transmitting the second signaling group is a candidate frequency band resource with a frequency point of a highest subcarrier arranged highest among the K2 candidate frequency band resources.

In one subembodiment, information bits included in the Q1 physical layer signalings are the same.

In one subembodiment, any one of the Q1 physical layer signalings is used for indicating the K2 candidate frequency band resources from the K1 first-type candidate frequency band resources.

Embodiment 13

Figure 13:
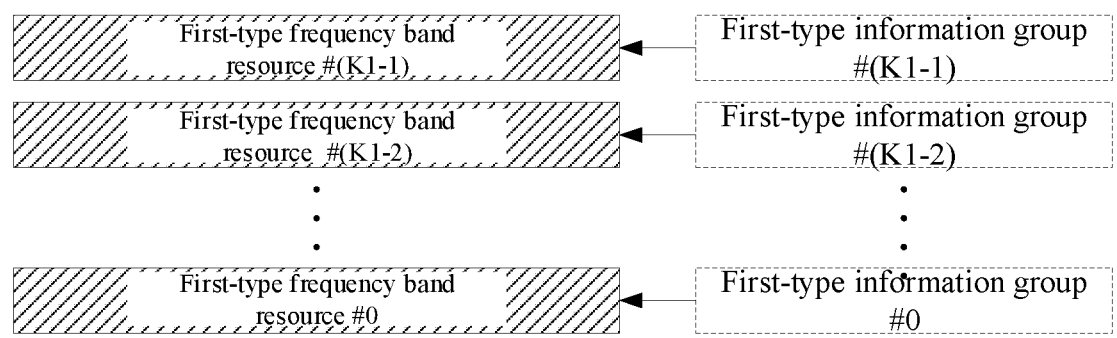
FIG. 13 is a diagram illustrating K1 first-type information groups according to one embodiment of the disclosure.

Embodiment 13 illustrates a diagram of K1 first-type information groups, as shown in FIG. 13. In FIG. 13, the K1 first-type information groups correspond to a first-type information group #0 to a first-type information group #(K1-1), the K1 first-type frequency band resources in the disclosure correspond to a first-type frequency band resource #0 to a first-type frequency band resource #(K1-1); and the first-type information group #0 to the first-type information group #(K1-1) correspond to the first-type frequency band resource #0 to the first-type frequency band resource #(K1-1) respectively.

In one subembodiment, the K1 first-type information groups are transmitted through an RRC signaling.

Embodiment 14

Figure 14:
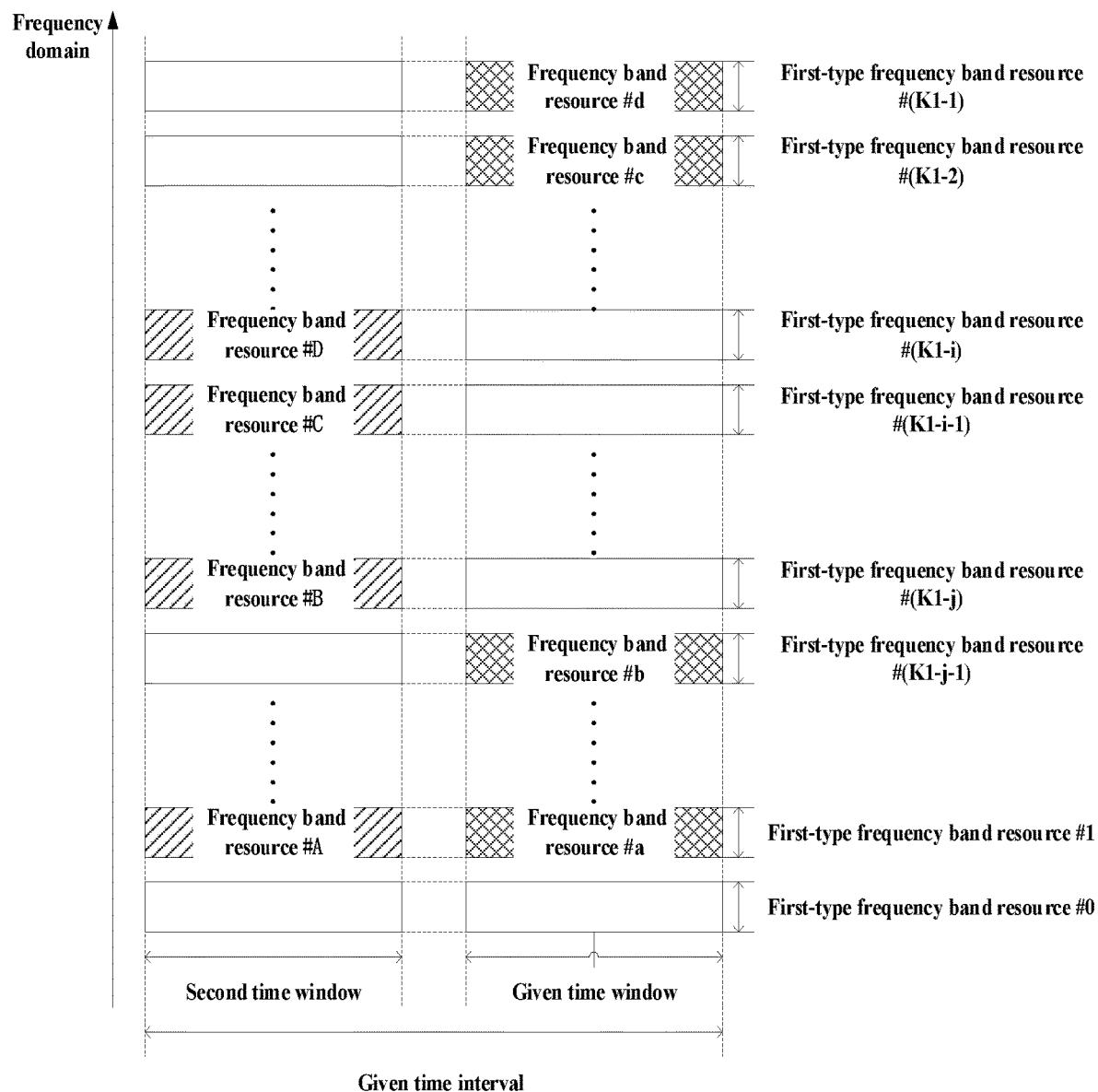
FIG. 14 is a diagram illustrating K3 second-type information groups according to one embodiment of the disclosure.

Embodiment 14 illustrates a diagram of K3 second-type information groups, as shown in FIG. 14. In FIG. 14, the K2 candidate frequency band resources in the disclosure include a frequency band resource #A, a frequency band resource #B, a frequency band resource #C and a frequency band resource #D in a second time window; the frequency band resource #A, the frequency band resource #B, the frequency band resource #C and the frequency band resource #D correspond to a first-type frequency resource #1, a first-type frequency resource #(K1-j), a first-type frequency resource #(K1-i-1) and a first-type frequency resource #(K1-i) respectively in the second time window; a first-type frequency band resource #0 to a first-type frequency resource #(K-1) keep frequency-domain positions unchanged within a given time interval.

In one subembodiment, at least one of the frequency band resource #A, the frequency band resource #B, the frequency band resource #C and the frequency band resource #D does not belong to frequency band resources occupied by a frequency band resource #a, a frequency band resource #b, a frequency band resource #c and a frequency band resource #d shown in FIG. 14.

In one subembodiment, the second time window and the given time window both have durations equal to T milliseconds in time domain; and the given time interval includes a positive integer number of consecutive T milliseconds.

In one subembodiment, the K3 is equal to 4, and the K3 second-type information groups are applicable to the frequency band resource #A, the frequency band resource #B, the frequency band resource #C and the frequency band resource #D in the second time window respectively; and the K3 second-type information groups are applicable to the frequency band resource #a, the frequency band resource #b, the frequency band resource #c and the frequency band resource #d in the given time window respectively.

In one subembodiment, the K3 is greater than 4, and the K3 second-type information groups include a second-type information group #1, a second-type information group #2, a second-type information group #3 and a second-type information group #4; the second-type information group #1, the second-type information group #2, the second-type information group #3 and the second-type information group #4 are applicable to the frequency band resource #A, the frequency band resource #B, the frequency band resource #C and the frequency band resource #D in the second time window respectively; and the second-type information group #1, the second-type information group #2, the second-type information group #3 and the second-type information group #4 are applicable to the frequency band resource #a, the frequency band resource #b, the frequency band resource #c and the frequency band resource #d in the given time window respectively.

In one subembodiment, the K3 is less than 4, and the K3 second-type information groups are applicable to the former K3 frequency band resources among the frequency band resource #A, the frequency band resource #B, the frequency band resource #C and the frequency band resource #D in the second time window respectively; and the K3 second-type information groups are applicable to the former K3 frequency band resources among the frequency band resource #a, the frequency band resource #b, the frequency band resource #c and the frequency band resource #d in the given time window respectively;

In one subembodiment, the frequency band resource #a, the frequency band resource #b, the frequency band resource #c and the frequency band resource #d all belong to a given frequency band resource group, and the given frequency band resource group includes K4 frequency band resources.

In one affiliated embodiment of the above subembodiment, the K4 is equal to the K2.

In one affiliated embodiment of the above subembodiment, an index of the frequency band resource #a in the given frequency band resource group is equal to an index of the frequency band resource #A in the K2 candidate frequency band resources.

In one affiliated embodiment of the above subembodiment, an index of the frequency band resource #b in the given frequency band resource group is equal to an index of the frequency band resource #B in the K2 candidate frequency band resources.

In one affiliated embodiment of the above subembodiment, an index of the frequency band resource #c in the given frequency band resource group is equal to an index of the frequency band resource #C in the K2 candidate frequency band resources.

In one affiliated embodiment of the above subembodiment, an index of the frequency band resource #d in the given frequency band resource group is equal to an index of the frequency band resource #D in the K2 candidate frequency band resources.

In one subembodiment, the K3 is independent of the K2; the K3 second-type information groups are applicable to the frequency band resource #A, the frequency band resource #B, the frequency band resource #C and the frequency band resource #D in the second time window; and the K3 second-type information groups are applicable to the frequency band resource #a, the frequency band resource #b, the frequency band resource #c and the frequency band resource #d in the given time window.

Embodiment 15

Figure 15:
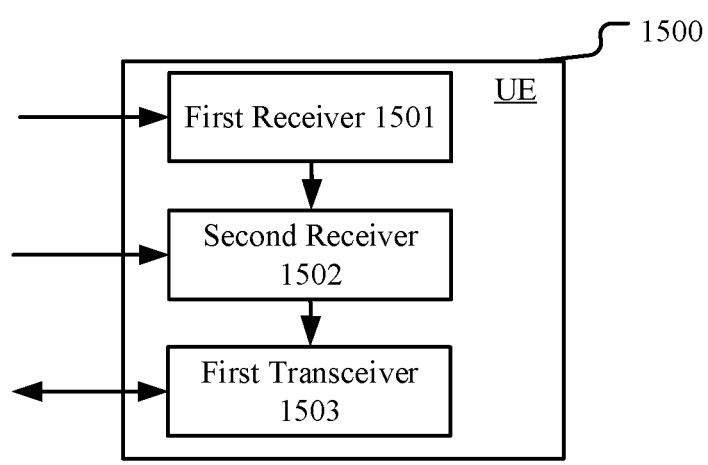
FIG. 15 is a structure block diagram illustrating a processing device in a UE according to one embodiment of the disclosure.

Embodiment 15 illustrates a structure block diagram of a processing device in a UE, as shown in FIG. 15. In FIG. 15, the processing device 1500 in the UE is mainly composed of a first receiver 1501, a second receiver 1502 and a first transceiver 1503.

The first receiver 1501 receives a first signaling in a first time window.

The second receiver 1502 receives a second signaling group in a second time window, the second signaling group being used for indicating K2 candidate frequency band resource(s).

The first transceiver 1503 monitors a third signaling in a second frequency band resource.

In Embodiment 15, the second signaling group includes Q1 physical layer signaling(s), and the Q1 is a positive integer; the second frequency band resource is one of the K2 candidate frequency band resource(s), and a first field in the first signaling is used for determining the second frequency band resource from the K2 candidate frequency band resource(s); the first signaling is a physical layer signaling, and the third signaling is a physical layer signaling; and the K2 is a positive integer.

In one subembodiment, the first transceiver 1503 also transmits a first radio signal; the third signaling includes first configuration information, and the first configuration information is applicable to the first radio signal; and the first configuration information includes at least one of occupied frequency domain resources, occupied time domain resources, an MCS and a HARQ process number.

In one subembodiment, the first transceiver 1503 also receives a first radio signal; the third signaling includes first configuration information, and the first configuration information is applicable to the first radio signal; and the first configuration information includes at least one of occupied frequency domain resources, occupied time domain resources, an MCS and a HARQ process number.

In one subembodiment, the second receiver 1502 also receives K1 first-type information group(s); the K1 first-type information group(s) is(are) specific for K1 first-type frequency band resource(s) respectively; the K2 candidate frequency band resource(s) is(are) a subset belonging to the K1 first-type frequency band resource(s); the K1 first-type information group(s) is(are) all transmitted through an air interface; and the K1 is positive integer.

In one subembodiment, the second receiver 1502 also receives K3 second-type information group(s); the K3 second-type information group(s) is(are) specific for the K2 candidate frequency band resource(s), and the K3 second-type information group(s) is(are) all transmitted through an air interface; and the K3 is a positive integer.

In one subembodiment, the second receiver 1502 also detects K2 first-type reference signal(s) in the K1 first-type frequency band resource(s) in the second time window; and a detection for the K2 first-type reference signal(s) is used for determining the K2 candidate frequency band resource(s).

In one subembodiment, the first receiver 1501 includes at least the former two of the receiver 456, the receiving processor 452 and the controller/processor 490 illustrated in Embodiment 4.

In one subembodiment, the second receiver 1502 includes at least the former two of the receiver 456, the receiving processor 452 and the controller/processor 490 illustrated in Embodiment 4.

In one subembodiment, the first transceiver 1503 includes at least the former four of the transmitter/receiver 456, the transmitting processor 455, the receiving processor 452 and the controller/processor 490 illustrated in Embodiment 4.

Embodiment 16

Figure 16:
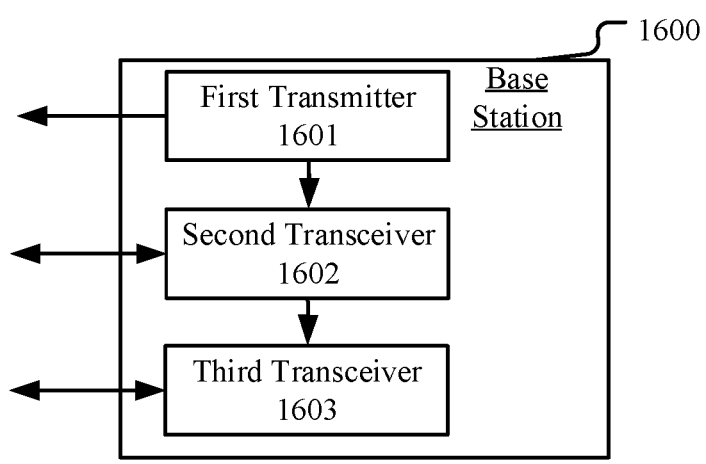
FIG. 16 is a structure block diagram illustrating a processing device in a base station according to one embodiment of the disclosure.

Embodiment 16 illustrates a structure block diagram of a processing device in a base station, as shown in FIG. 16. In FIG. 16, the processing device 1600 in the base station is mainly composed of a first transmitter 1601, a second transceiver 1602 and a third transceiver 1603.

The first transmitter 1601 transmits a first signaling in a first time window.

The second transceiver 1602 transmits a second signaling group in a second time window, the second signaling group being used for indicating K2 candidate frequency band resource(s).

The third transceiver 1603 transmits a third signaling in a second frequency band resource.

In Embodiment 16, the second signaling group includes Q1 physical layer signaling(s), and the Q1 is a positive integer; the second frequency band resource is one of the K2 candidate frequency band resource(s), and a first field in the first signaling is used for determining the second frequency band resource from the K2 candidate frequency band resource(s); the first signaling is a physical layer signaling, and the third signaling is a physical layer signaling; and the K2 is a positive integer.

In one subembodiment, the third transceiver 1603 also transmits a first radio signal; the third signaling includes first configuration information, and the first configuration information is applicable to the first radio signal; and the first configuration information includes at least one of occupied frequency domain resources, occupied time domain resources, an MCS and a HARQ process number.

In one subembodiment, the third transceiver 1603 also receives a first radio signal; the third signaling includes first configuration information, and the first configuration information is applicable to the first radio signal; and the first configuration information includes at least one of occupied frequency domain resources, occupied time domain resources, an MCS and a HARQ process number.

In one subembodiment, the second transceiver 1602 also transmits K1 first-type information group(s); the K1 first-type information group(s) is(are) specific for K1 first-type frequency band resource(s) respectively; the K1 first-type information group(s) is(are) all transmitted through an air interface; and the K1 is positive integer.

In one subembodiment, the second transceiver 1602 also transmits K3 second-type information group(s); the K3 second-type information group(s) is(are) specific for the K2 candidate frequency band resource(s), and the K3 second-type information group(s) is(are) all transmitted through an air interface; and the K3 is a positive integer.

In one subembodiment, the second transceiver 1602 also transmits K2 first-type reference signal(s) in K2 candidate frequency band resource(s) in the second time window respectively; and a detection for the K2 first-type reference signal(s) is used for determining the K2 candidate frequency band resource(s).

In one subembodiment, the second transceiver 1602 also performs K1 energy detection(s) for the K1 first-type frequency band resource(s) in the second time window respectively; and the K1 energy detection(s) is(are) used for determining that the K2 candidate frequency band resource(s) is(are) not occupied.

In one subembodiment, the first transmitter 1601 includes at least the former two of the transmitter 416, the transmitting processor 415 and the controller/processor 440 illustrated in Embodiment 4.

In one subembodiment, the second transceiver 1602 includes at least the former four of the receiver/transmitter 416, the transmitting processor 415, the receiving processor 412 and the controller/processor 440 illustrated in Embodiment 4.

In one subembodiment, the third transceiver 1603 includes at least the former four of the receiver/transmitter 416, the transmitting processor 415, the receiving processor 412 and the controller/processor 440 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the present disclosure include but not limited to unmanned aerial vehicles, communication modules on unmanned aerial vehicles, tele-controlled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, etc. The base station in the present application includes but not limited to macro-cellular base stations, micro-cellular base stations, home base stations, relay base station, gNB (NR node B), Transmitter Receiver Point (TRP) and radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:
receiving a first signaling in a first time window;
receiving a second signaling group in a second time window, the second signaling group being used for indicating K2 candidate frequency band resource(s); and
monitoring a third signaling in a second frequency band resource;
receiving K3 second-type information group(s);
wherein the second signaling group comprises Q1 physical layer signaling(s), and the Q1 is a positive integer; the second frequency band resource is one of the K2 candidate frequency band resource(s), and a first field in the first signaling is used for determining the second frequency band resource from the K2 candidate frequency band resource(s); the first signaling is a physical layer signaling, and the third signaling is a physical layer signaling; and the K2 is a positive integer; the second time window is located behind the first time window in time domain; the K3 second-type information group(s) is(are) specific for the K2 candidate frequency band resource(s), and the K3 second-type information group(s) is(are) all transmitted through an air interface; and the K3 is a positive integer; the K3 second-type information groups are specific for K3 candidate frequency band resources among the K2 candidate frequency band resources respectively; the K3 is a positive integer not greater than the K2; the K3 candidate frequency band resources are K3 candidate frequency band resources with a lowest center frequency point among the K2 candidate frequency band resources, or the K3 candidate frequency band resources are K3 candidate frequency band resources with a highest center frequency point among the K2 candidate frequency band resources, or the K3 candidate frequency band resources are K3 candidate frequency band resources with a frequency point of a highest subcarrier arranged lowest among the K2 candidate frequency band resources, or the K3 candidate frequency band resources are K3 candidate frequency band resources with a frequency point of a highest subcarrier arranged highest among the K2 candidate frequency band resources.

2. The method according to claim 1, comprising:
operating a first radio signal;
wherein the operating is receiving, or the operating is transmitting; the third signaling comprises first configuration information, and the first configuration information is applicable to the first radio signal; and the first configuration information comprises at least one of occupied frequency domain resources, occupied time domain resources, a Modulation and Coding Scheme (MCS) and a Hybrid Automatic Repeat request (HARQ) process number.

3. The method according to claim 1, comprising:
receiving K1 first-type information group(s);
wherein the K1 first-type information group(s) is(are) specific for K1 first-type frequency band resource(s) respectively; the K2 candidate frequency band resource(s) is(are) a subset belonging to the K1 first-type frequency band resource(s); the K1 first-type information group(s) is(are) all transmitted through an air interface; and the K1 is positive integer.

4. The method according to claim 3, comprising:
detecting K2 first-type reference signal(s) in the K1 first-type frequency band resource(s) in the second time window;
wherein a detection for the K2 first-type reference signal(s) is used for determining the K2 candidate frequency band resource(s).

5. A method in a base station for wireless communication, comprising:
transmitting a first signaling in a first time window;
transmitting a second signaling group in a second time window, the second signaling group being used for indicating K2 candidate frequency band resource(s); and
transmitting a third signaling in a second frequency band resource;
transmitting K3 second-type information group(s);
wherein the second signaling group comprises Q1 physical layer signaling(s), and the Q1 is a positive integer; the second frequency band resource is one of the K2 candidate frequency band resource(s), and a first field in the first signaling is used for determining the second frequency band resource from the K2 candidate frequency band resource(s); the first signaling is a physical layer signaling, and the third signaling is a physical layer signaling; and the K2 is a positive integer; the second time window is located behind the first time window in time domain; the K3 second-type information group(s) is(are) specific for the K2 candidate frequency band resource(s), and the K3 second-type information group(s) is(are) all transmitted through an air interface; and the K3 is a positive integer; the K3 second-type information groups are specific for K3 candidate frequency band resources among the K2 candidate frequency band resources respectively; the K3 is a positive integer not greater than the K2; the K3 candidate frequency band resources are K3 candidate frequency band resources with a lowest center frequency point among the K2 candidate frequency band resources, or the K3 candidate frequency band resources are K3 candidate frequency band resources with a highest center frequency point among the K2 candidate frequency band resources, or the K3 candidate frequency band resources are K3 candidate frequency band resources with a frequency point of a highest subcarrier arranged lowest among the K2 candidate frequency band resources, or the K3 candidate frequency band resources are K3 candidate frequency band resources with a frequency point of a highest subcarrier arranged highest among the K2 candidate frequency band resources.

6. The method according to claim 5, comprising:
processing a first radio signal;
wherein the processing is transmitting, or the processing is receiving; the third signaling comprises first configuration information, and the first configuration information is applicable to the first radio signal; and the first configuration information comprises at least one of occupied frequency domain resources, occupied time domain resources, an MCS and a HARQ process number.

7. The method according to claim 5, comprising:
transmitting K1 first-type information group(s);
wherein the K1 first-type information group(s) is(are) specific for K1 first-type frequency band resource(s)

respectively; the K2 candidate frequency band resource(s) is(are) a subset belonging to the K1 first-type frequency band resource(s); the K1 first-type information group(s) is(are) all transmitted through an air interface; and the K1 is positive integer.

8. The method according to claim 7, comprising:
transmitting K2 first-type reference signal(s) in K2 candidate frequency band resource(s) in the second time window respectively;
wherein a detection for the K2 first-type reference signal(s) is used for determining the K2 candidate frequency band resource(s),
or, comprising:
performing K1 energy detection(s) for the K1 first-type frequency band resource(s) in the second time window respectively;
wherein the K1 energy detection(s) is(are) used for determining that the K2 candidate frequency band resource(s) is(are) not occupied.

9. A UE for wireless communication, comprising:
a first receiver, to receive a first signaling in a first time window;
a second receiver, to receive a second signaling group in a second time window, the second signaling group being used for indicating K2 candidate frequency band resource(s); and
a first transceiver, to monitor a third signaling in a second frequency band resource;
wherein the second signaling group comprises Q1 physical layer signaling(s), and the Q1 is a positive integer; the second frequency band resource is one of the K2 candidate frequency band resource(s), and a first field in the first signaling is used for determining the second frequency band resource from the K2 candidate frequency band resource(s); the first signaling is a physical layer signaling, and the third signaling is a physical layer signaling; and the K2 is a positive integer; the second time window is located behind the first time window in time domain; the second receiver receives K3 second-type information group(s); the K3 second-type information group(s) is(are) specific for the K2 candidate frequency band resource(s), and the K3 second-type information group(s) is(are) all transmitted through an air interface; and the K3 is a positive integer; the K3 second-type information groups are specific for K3 candidate frequency band resources among the K2 candidate frequency band resources respectively; the K3 is a positive integer not greater than the K2; the K3 candidate frequency band resources are K3 candidate frequency band resources with a lowest center frequency point among the K2 candidate frequency band resources, or the K3 candidate frequency band resources are K3 candidate frequency band resources with a highest center frequency point among the K2 candidate frequency band resources, or the K3 candidate frequency band resources are K3 candidate frequency band resources with a frequency point of a highest subcarrier arranged lowest among the K2 candidate frequency band resources, or the K3 candidate frequency band resources are K3 candidate frequency band resources with a frequency point of a highest subcarrier arranged highest among the K2 candidate frequency band resources.

10. The UE according to claim 9, wherein the first transceiver operates a first radio signal; the operate is receive, or the operate is transmit; the third signaling comprises first configuration information, and the first configuration information is applicable to the first radio signal; and the first configuration information comprises at least one of occupied frequency domain resources, occupied time domain resources, an MCS and a HARQ process number.

11. The UE according to claim 9, wherein the second receiver receives K1 first-type information group(s); the K1 first-type information group(s) is(are) specific for K1 first-type frequency band resource(s) respectively; the K2 candidate frequency band resource(s) is(are) a subset belonging to the K1 first-type frequency band resource(s); the K1 first-type information group(s) is(are) all transmitted through an air interface; and the K1 is positive integer.

12. The UE according to claim 11, wherein the second receiver detects K2 first-type reference signal(s) in the K1 first-type frequency band resource(s) in the second time window; and a detection for the K2 first-type reference signal(s) is used for determining the K2 candidate frequency band resource(s).

13. A base station for wireless communication, comprising:
a first transmitter, to transmit a first signaling in a first time window;
a second transceiver, to transmit a second signaling group in a second time window, the second signaling group being used for indicating K2 candidate frequency band resource(s); and
a third transceiver, to transmit a third signaling in a second frequency band resource;
wherein the second signaling group comprises Q1 physical layer signaling(s), and the Q1 is a positive integer; the second frequency band resource is one of the K2 candidate frequency band resource(s), and a first field in the first signaling is used for determining the second frequency band resource from the K2 candidate frequency band resource(s); the first signaling is a physical layer signaling, and the third signaling is a physical layer signaling; and the K2 is a positive integer; the second time window is located behind the first time window in time domain; the second transceiver transmits K3 second-type information group(s); the K3 second-type information group(s) is(are) specific for the K2 candidate frequency band resource(s), and the K3 second-type information group(s) is(are) all transmitted through an air interface; and the K3 is a positive integer; the K3 second-type information groups are specific for K3 candidate frequency band resources among the K2 candidate frequency band resources respectively; the K3 is a positive integer not greater than the K2; the K3 candidate frequency band resources are K3 candidate frequency band resources with a lowest center frequency point among the K2 candidate frequency band resources, or the K3 candidate frequency band resources are K3 candidate frequency band resources with a highest center frequency point among the K2 candidate frequency band resources, or the K3 candidate frequency band resources are K3 candidate frequency band resources with a frequency point of a highest subcarrier arranged lowest among the K2 candidate frequency band resources, or the K3 candidate frequency band resources are K3 candidate frequency band resources with a frequency point of a highest subcarrier arranged highest among the K2 candidate frequency band resources.

14. The base station according to claim 13, wherein the third transceiver processes a first radio signal; the process is transmit, or the process is receive; the third signaling comprises first configuration information, and the first configuration information is applicable to the first radio signal; and the first configuration information comprises at least one of occupied frequency domain resources, occupied time domain resources, an MCS and a HARQ process number.

15. The base station according to claim 13, wherein the second transceiver transmits K1 first-type information group(s); the K1 first-type information group(s) is(are) specific for K1 first-type frequency band resource(s) respectively; the K2 candidate frequency band resource(s) is(are) a subset belonging to the K1 first-type frequency band resource(s); the K1 first-type information group(s) is(are) all transmitted through an air interface; and the K1 is positive integer.

16. The base station according to claim 15, wherein the second transceiver transmits K2 first-type reference signal(s) in K2 candidate frequency band resource(s) in the second time window respectively; and a detection for the K2 first-type reference signal(s) is used for determining the K2 candidate frequency band resource(s);

or, wherein the second transceiver performs K1 energy detection(s) for the K1 first-type frequency band resource(s) in the second time window respectively; and the K1 energy detection(s) is(are) used for determining that the K2 candidate frequency band resource(s) is(are) not occupied.

\* \* \* \* \*